US012562453B2

(12) United States Patent
Lai et al.

(10) Patent No.: US 12,562,453 B2
(45) Date of Patent: Feb. 24, 2026

(54) ELECTRONIC DEVICE

(71) Applicant: Huawei Technologies Co., Ltd.,
Shenzhen (CN)

(72) Inventors: Ben Lai, Wuhan (CN); Ning Ma,
Shenzhen (CN); Hanyang Wang,
Reading (GB); Yuhui Wang, Shenzhen
(CN)

(73) Assignee: **HUAWEI TECHNOLOGIES CO.,
LTD.**, Shenzhen (CN)

( * ) Notice: Subject to any disclaimer, the term of this
patent is extended or adjusted under 35
U.S.C. 154(b) by 286 days.

(21) Appl. No.: 18/027,593

(22) PCT Filed: Sep. 8, 2021

(86) PCT No.: PCT/CN2021/117203
§ 371 (c)(1),
(2) Date: Mar. 21, 2023

(87) PCT Pub. No.: WO2022/057705
PCT Pub. Date: Mar. 24, 2022

(65) Prior Publication Data
US 2023/0402737 A1 Dec. 14, 2023

(30) Foreign Application Priority Data
Sep. 21, 2020 (CN) .......................... 202010997825.0

(51) Int. Cl.
*H01Q 1/22* (2006.01)
*G06F 1/16* (2006.01)
*H01Q 13/10* (2006.01)
(52) U.S. Cl.
CPC ......... *H01Q 1/2266* (2013.01); *G06F 1/1681*
(2013.01); *H01Q 13/10* (2013.01)

(58) Field of Classification Search
CPC ............ H01Q 1/2266; H01Q 13/10–18; G06F
1/1681
See application file for complete search history.

(56) References Cited

U.S. PATENT DOCUMENTS 5,805,415 A 9/1998 Tran et al.
2010/0207826 A1* 8/2010 Ryou ................... H01Q 1/2266
343/702

(Continued)

FOREIGN PATENT DOCUMENTS

CN 10840042 A 8/2018
CN 111584999 A 8/2020

(Continued)

*Primary Examiner* — Amal Patel
(74) *Attorney, Agent, or Firm* — Conley Rose, P.C.

(57) ABSTRACT

An electronic device includes a display screen, a keyboard
host, a hinge, an electrical connecting element, a first feed
member, and a first ground member. The display screen is
rotatably coupled to the keyboard host through the hinge.
Both a housing of the display screen and a housing of the
keyboard host are metal housings, a main radiating slot is
formed between an edge of the display screen that is close
proximate to the hinge and an edge of the keyboard host that
is proximate to the hinge, the electrical connecting element
passes through the main radiating slot to electrically couple
the display screen to the keyboard host, the first feed
member and the first ground member are disposed in the
main radiating slot, and the first feed member is located on
a side of the first ground member that is far away from the
electrical connecting element.

20 Claims, 26 Drawing Sheets

(56)                  References Cited

U.S. PATENT DOCUMENTS

| | | | |
|---|---|---|---|
| 2014/0104121 A1* | 4/2014 | Lee ......................... | H01Q 1/24 |
| | | | 343/702 |
| 2014/0292613 A1 | 10/2014 | Hsiao et al. | |
| 2017/0141455 A1* | 5/2017 | Lin ........................ | H01Q 21/28 |
| 2019/0067794 A1 | 2/2019 | Klein et al. | |

FOREIGN PATENT DOCUMENTS

| | | | | |
|---|---|---|---|---|
| GB | 2542257 A | 3/2017 | | |
| JP | 2007235592 A | 9/2007 | | |
| TW | 201210123 A | 3/2012 | | |
| WO | 2012028174 A | 3/2012 | | |
| WO | WO-2012028174 A1 * | 3/2012 | ............. | H01Q 1/243 |

* cited by examiner

131

131/16

17

15

11

12

A

ELECTRONIC DEVICE

CROSS-REFERENCE TO RELATED APPLICATIONS

This is a U.S. National Stage of International Patent Application No. PCT/CN2021/117203 filed on Sep. 8, 2021, which claims priority to Chinese Patent Application No. 202010997825.0 filed on Sep. 21, 2020, both of which are hereby incorporated by reference in their entireties.

TECHNICAL FIELD

This application relates to the field of electronic device technologies, and in particular, to an electronic device.

BACKGROUND

In recent years, as electronic devices such as mobile phones, tablet computers, and notebook computers gradually develop towards optimized functions and thinness, antenna clearance in the electronic devices is increasingly small, and layout space of the electronic devices is increasingly limited. Many new communication specifications such as a 5G communication specification emerge in the meantime. 5G mobile communication is mainly based on a multiple-input multiple-output (multiple-input multiple-output, MIMO) antenna system. The MIMO antenna system includes two or more antenna elements, and a specific spacing needs to be reserved between two adjacent antenna elements, to ensure isolation between antenna elements. Such an antenna system requires large clearances in electronic devices, and consequently hinders the electronic devices from developing towards optimized functions and thinness. In addition, as electronic devices gradually develop towards metalized bodies, antennas are disposed inside the electronic devices, and non-metalized windows need to be disposed on housings of the electronic devices. As a result, the bodies of the electronic devices cannot be fully metalized.

SUMMARY

This application provides an electronic device, to enable the electronic device to have a wireless communication function without hindering the electronic device from developing towards optimized functions, thinness, and a fully metalized body.

To achieve the foregoing objective, some embodiments of this application provide an electronic device. The electronic device includes a display screen, a keyboard host, a hinge, an electrical connecting element, a first feed member, and a first ground member. The display screen is rotatably connected to the keyboard host through the hinge. Both a housing of the display screen and a housing of the keyboard host are metal housings, a main radiating slot is formed between an edge that is of the display screen and that is close to the hinge and an edge that is of the keyboard host and that is close to the hinge, the electrical connecting element passes through the main radiating slot to electrically connect the display screen to the keyboard host, the first feed member and the first ground member are disposed in the main radiating slot, the first feed member and the first ground member are disposed with an interval, and the first feed member is located on a side that is of the first ground member and that is far away from the electrical connecting element.

In this way, the housing of the display screen, the housing of the keyboard host, the first ground member, and the first feed member form a first slot antenna with one end open, the following content is defined: Two ends of the main radiating slot along a length direction of the main radiating slot are a first end and a second end, the first end and the first feed member are located on a same side of the first ground member, a length of the first slot antenna is a distance from the first ground member to the first end, and the length of the first slot antenna is approximately equal to ¼ times a resonance wavelength of the first slot antenna. In this case, the slot antenna with a ¼ wavelength is formed by using the slot between the display screen and the keyboard host, so that the electronic device has a wireless communication function without occupying internal space of the electronic device. Therefore, the electronic device is not hindered from developing towards optimized functions, thinness, and a fully metalized body.

Optionally, the hinge includes a first hinge, a material of the first hinge is a conductive material, an end that is of the first hinge and that is connected and electrically conducted to the display screen is connected to the housing of the display screen, an end that is of the first hinge and that is connected to the keyboard host is connected and electrically conducted to the housing of the keyboard host, and the first hinge constitutes the first ground member. In this way, the first ground member and the first hinge are a same structural member, so that a quantity of constituent structural members of the electronic device can be reduced, and structural complexity of the electronic device can be reduced.

Optionally, the hinge includes a first hinge, the first hinge and the first feed member are located on a same side of the first ground member, and an entire material of the first hinge is an insulation material.

Optionally, the hinge includes a first hinge, the first hinge and the first feed member are located on a same side of the first ground member, the first hinge includes a first conductive part, a second conductive part, and an insulation part, the first conductive part of the first hinge is connected to the housing of the display screen, the second conductive part of the first hinge is connected to the housing of the keyboard host, and the first conductive part and the second conductive part are spaced apart by a specific distance and are connected through the insulation part. This can prevent the first hinge from blocking the main radiating slot of the first slot antenna. Specifically, the insulation part may be a rotating shaft, a shaft sleeve, and parts in the rotating shaft and/or the shaft sleeve of the first hinge, provided that the insulation part can prevent a path that is between the housing of the display screen and the housing of the keyboard host and that is electrically conducted by the first hinge. This is not specifically limited herein.

Optionally, the first hinge includes a rotating shaft, a first shaft sleeve, and a second shaft sleeve. The rotating shaft includes a rotating shaft main body made of a metal material and an insulation material layer disposed around a side wall of the rotating shaft main body, the insulation material layer and the rotating shaft main body jointly constitute the insulation part, and the rotating shaft includes a first section and a second section that are disposed along a length direction of the rotating shaft. The first shaft sleeve constitutes the first conductive part, the second shaft sleeve constitutes the second conductive part, the first shaft sleeve is sleeved on the first section in a fitted manner, the second shaft sleeve is sleeved on the second section in a fitted manner, and the first shaft sleeve and the second shaft sleeve are spaced from each other along an axial direction of the rotating shaft. In this way, the rotating shaft is insulated by using the insulation material layer, so that insulation can be implemented between the rotating shaft and the first shaft sleeve and between the rotating shaft and the second shaft sleeve on a premise of ensuring structural strength of the rotating shaft. Such a structure is simple and is easy to implement.

Optionally, the first feed member is a conductive member disposed between the display screen and the keyboard host. An end that is of the first feed member and that is close to the display screen is electrically connected to the housing of the display screen, an end that is of the first feed member and that is close to the keyboard host is insulated from the housing of the keyboard host, the keyboard host includes a first radio frequency front-end, and the first radio frequency front-end is connected to the end that is of the first feed member and that is close to the keyboard host. In some embodiments, the first radio frequency front-end includes a transmit channel and a receive channel. The transmit channel includes components such as a power amplifier and a filter. After the components such as the power amplifier and the filter perform power amplification, filtering, and other processing on a signal, a processed signal is transmitted from the first feed member to the housing of the display screen, and then is transmitted from the housing of the display screen to an external world. The receive channel includes components such as a low noise amplifier and a filter. After the components such as the low noise amplifier and the filter perform low noise amplification, filtering, and other processing on an external signal received by the housing of the display screen, a processed external signal is transmitted to a radio frequency chip. In this way, communication between the electronic device and the external signal is implemented by using the housing of the display screen, the first feed member, and the first radio frequency front-end. The first radio frequency front-end is disposed in the housing of the keyboard host, and the first radio frequency front-end may be integrated on a mainboard in the keyboard host, or may be independent of the mainboard. This is not specifically limited herein. A structure form of the first feed member is a direct feed structure, and such a structure is simple and is easy to implement.

Optionally, the hinge includes a first hinge. The first hinge and the first feed member are located on a same side of the first ground member. An entire material of the first hinge is a metal conductive material, for example, zinc alloy, steel, iron, or stainless steel, or another semiconductor conductive material. An end that is of the first hinge and that is connected to the display screen is connected and electrically conducted to the housing of the display screen, and an end that is of the first hinge and that is connected to the keyboard host is connected to the housing of the keyboard host in an insulated manner. "Connected in an insulated manner" means that two objects are connected together, but there is no current conduction between the two objects. In some embodiments, an insulation plate is disposed between the housing of the keyboard host and the end that is of the first hinge and that is connected to the keyboard host, and the end that is of the first hinge and that is connected to the keyboard host, the insulation plate, and the housing of the keyboard host are connected together through an insulation connector, for example, an insulation bolt. In this way, the end that is of the first hinge and that is connected to the keyboard host is connected to the housing of the keyboard host in an insulated manner. The first hinge constitutes the first feed member. In this way, the first feed member and the first hinge are a same structural member, so that relative rotation between the display screen and the keyboard host is not affected, a quantity of constituent structural members of the electronic device can be reduced, and structural complexity of the electronic device can be reduced.

Optionally, the first feed member is a conductive member disposed between the display screen and the keyboard host. An end that is of the first feed member and that is close to the display screen is insulated from the housing of the display screen, an end that is of the first feed member and that is close to the keyboard host is electrically connected to the housing of the keyboard host, the keyboard host includes a first radio frequency front-end, and the first radio frequency front-end is electrically connected to the end that is of the first feed member and that is close to the display screen. In this way, the first radio frequency front-end feeds a radio frequency signal into the end that is of the first feed member and that is close to the display screen, and transmits the radio frequency signal to the housing of the keyboard host by using the first feed member, to radiate the radio frequency signal to an external environment by using the housing of the keyboard host. The first radio frequency front-end is further configured to receive a radio frequency signal received by the housing of the keyboard host. A structure form of the first feed member is a direct feed structure, and such a structure is simple and is easy to implement.

Optionally, the hinge includes a first hinge. The first hinge and the first feed member are located on a same side of the first ground member. An entire material of the first hinge is a metal conductive material, for example, zinc alloy, steel, iron, or stainless steel, or another semiconductor conductive material. An end that is of the first hinge and that is connected to the keyboard host is connected and electrically conducted to the housing of the keyboard host, and an end that is of the first hinge and that is connected to the display screen is connected to the housing of the display screen in an insulated manner. In some embodiments, an insulation plate is disposed between the housing of the display screen and the end that is of the first hinge and that is connected to the display screen, and the end that is of the first hinge and that is connected to the display screen, the insulation plate, and the housing of the display screen are connected together through an insulation connector, for example, an insulation bolt. In this way, the first hinge is connected to the housing of the display screen in an insulated manner. The first hinge constitutes the first feed member. In this way, the first feed member and the first hinge are a same structural member, so that relative rotation between the display screen and the keyboard host is not affected, a quantity of constituent structural members of the electronic device can be reduced, and structural complexity of the electronic device can be reduced.

Optionally, the display screen includes a rotating shaft cover, the rotating shaft cover is connected to the housing of the display screen, the rotating shaft cover is located on an outer side of the hinge, and a material of the rotating shaft cover is a conductive material. In some embodiments, the material of the rotating shaft cover is a metal conductive material. The main radiating slot is formed between an edge that is of the rotating shaft cover and that is far away from the housing of the display screen and the edge that is of the keyboard host and that is close to the hinge. The first feed member is a feed slot disposed on the rotating shaft cover, one end of the feed slot is closed, the other end of the feed slot is connected to the main radiating slot, the feed slot has a first feed point, the keyboard host includes a first radio frequency front-end, and the first radio frequency front-end is electrically connected to the first feed point. In this way, the first radio frequency front-end feeds a radio frequency signal into the feed slot, and couples the radio frequency signal to the housing of the keyboard host by using the feed slot, to radiate the radio frequency signal to an external environment by using the housing of the keyboard host. The first radio frequency front-end is further configured to receive a radio frequency signal received by the housing of the keyboard host. A structure form of the first feed member is a coupling feed structure, and such a structure is simple and is easy to implement. A shape of the feed slot may be a straight line shape, an L shape, or another shape.

Optionally, the display screen includes a rotating shaft cover, the rotating shaft cover is connected to the housing of the display screen, the rotating shaft cover is located on an outer side of the hinge, and a material of the rotating shaft cover is an insulation material. The first feed member is a feed metal wire disposed on the rotating shaft cover, an end of the feed metal wire is connected to the housing of the display screen, the feed metal wire has a second feed point, the keyboard host includes a first radio frequency front-end, and the first radio frequency front-end is electrically connected to the second feed point. In this way, the first radio frequency front-end feeds a radio frequency signal into the feed metal wire, and couples the radio frequency signal to the housing of the keyboard host by using the feed metal wire, to radiate the radio frequency signal to an external environment by using the housing of the keyboard host. The first radio frequency front-end is further configured to receive a radio frequency signal received by the housing of the keyboard host. A structure form of the first feed member is a coupling feed structure, and such a structure is simple and is easy to implement. A shape of the feed metal wire may be a straight line shape, an L shape, or another shape.

Optionally, the first hinge constitutes the first feed member. The first shaft sleeve is connected and electrically conducted to the housing of the display screen, the second shaft sleeve is connected to the housing of the keyboard host in an insulated manner, the keyboard host includes a first radio frequency front-end, and the first radio frequency front-end is electrically connected to the second shall sleeve. In this way, the first radio frequency front-end feeds a radio frequency signal into the second shaft sleeve, couples the radio frequency signal to the first shaft sleeve by using the second shaft sleeve, and transmits the radio frequency signal to the housing of the display screen by using the first shaft sleeve, to radiate the radio frequency signal to an external environment by using the housing of the display screen. A structure form of the first feed member is a coupling feed structure, and such a structure is simple and is easy to implement. In addition, the first feed member and the first hinge are a same structural member, so that a quantity of constituent structural members of the electronic device can be reduced, structural complexity of the electronic device can be reduced, and relative rotation between the display screen and the keyboard host is not affected.

Optionally, the first hinge constitutes the first feed member. The first shall sleeve is connected to the housing of the display screen in an insulated manner, the second shaft sleeve is connected and electrically conducted to the housing of the keyboard host, the keyboard host includes a first radio frequency front-end, and the first radio frequency front-end is electrically connected to the first shall sleeve. In this way, the first radio frequency front-end feeds a radio frequency signal into the first shaft sleeve, couples the radio frequency signal to the second shaft sleeve by using the first shaft sleeve, and transmits the radio frequency signal to the housing of the keyboard host by using the second shaft sleeve, to radiate the radio frequency signal to an external environment by using the housing of the keyboard host. A structure form of the first feed member is a coupling feed structure, and such a structure is simple and is easy to implement. In addition, the first feed member and the first hinge are a same structural member, so that a quantity of constituent structural members of the electronic device can be reduced, structural complexity of the electronic device can be reduced, and relative rotation between the display screen and the keyboard host is not affected.

Optionally, the display screen includes a rotating shaft cover, the rotating shaft cover is connected to the housing of the display screen, the rotating shaft cover is located on an outer side of the hinge, a material of the rotating shaft cover is a conductive material, the main radiating slot is formed between an edge that is of the rotating shaft cover and that is far away from the display screen and an edge that is of the keyboard host and that is close to the hinge. At least one parasitic radiating slot is disposed on the rotating shaft cover, one end of the parasitic radiating slot is closed, the other end of the parasitic radiating slot is connected to the main radiating slot, and the at least one parasitic radiating slot and the first feed member are located on a same side of the first ground member. In this way, the parasitic radiating slot is an added parasitic radiating slot in the first slot antenna other than the main radiating slot. Therefore, a quantity of resonance points of the first slot antenna can be increased, and bandwidth of the first slot antenna can be increased.

Optionally, the display screen includes a rotating shaft cover, the rotating shaft cover is connected to the housing of the display screen, the rotating shaft cover is located on an outer side of the hinge, and a material of the rotating shaft cover is an insulation material. At least one first parasitic radiator is disposed on the rotating shaft cover, a ground end of the first parasitic radiator is connected to the housing of the display screen, and the at least one first parasitic radiator and the first feed member are located on a same side of the first ground member. In this way, the first parasitic radiator is an added parasitic radiator in the first slot antenna other than the main radiating slot. Therefore, a quantity of resonance points of the first slot antenna can be increased, and bandwidth of the first slot antenna can be increased.

Optionally, a groove is disposed on a surface that is of the keyboard host and that faces the main radiating slot, a side wall and a bottom wall of the groove belong to the housing of the keyboard host, at least one second parasitic radiator is disposed in the groove, a ground end of the second parasitic radiator is connected to the side wall or the bottom wall of the groove, and the at least one second parasitic radiator and the first feed member are located on a same side of the first ground member. In tins way, the second parasitic radiator is an added parasitic radiator in the first slot antenna other than the main radiating slot. Therefore, a quantity of resonance points of the first slot antenna can be increased, and bandwidth of the first slot antenna can be increased. In addition, the second parasitic radiator is disposed in the groove. This can avoid interference between the second parasitic radiator and the display screen caused because the second parasitic radiator protrudes from an outer surface of the keyboard host.

Optionally, the second parasitic radiator extends along a plane, the plane on which the second parasitic radiator is located is parallel to the bottom wall of the groove, and the ground end of the second parasitic radiator is connected to the side wall of the groove. In this way, a setting depth of the groove can be reduced.

Optionally, the electronic device further includes a dielectric plate. The dielectric plate includes a first surface and a second surface that are opposite to each other, the dielectric plate is disposed in the groove, the first surface of the dielectric plate is attached to the bottom wall of the groove, and the second parasitic radiator is disposed on the second surface of the dielectric plate. Such a structure is simple and is easy to fabricate.

Optionally, the electronic device further includes a second feed member and a second ground member. The second feed member and the second ground member are disposed in the main radiating slot, the second feed member and the second ground member are disposed with an interval, the second ground member and the first ground member are located on two opposite sides of the electrical connecting element, and the second feed member is located on a side that is of the second ground member and that is far away from the electrical connecting element. In this way, the housing of the display screen, the housing of the keyboard host, the second ground member, and the second feed member form a second slot antenna. The second end and the second feed member are located on a same side of the second ground member, and a length of the second slot antenna is a distance from the second ground member to the second end. The first slot antenna and the second slot antenna may form a MIMO antenna or a dual low frequency antenna. The first slot antenna and the second slot antenna are located at the two ends of the main radiating slot. A distance between the first slot antenna and the second slot antenna is long, and isolation is high.

REFERENCE NUMERALS

1: electronic device; 11: display screen; 12: keyboard host; 13: hinge; 131: first hinge; 1311: rotating shaft; 1311*a*: rotating shaft main body; 1311*b*: insulation material layer; 1312: first shaft sleeve; 1312*a*: first wing part; 1313: second shaft sleeve; 1313*a*: second wing part; 14: electrical connecting element; 15: main radiating slot; 16: first ground member. 17: first feed member; 17*a*: feed structure; 111: rotating shaft cover; 18: parasitic radiating slot; 19: first parasitic radiator; 20: groove; 21: second parasitic radiator; 22: dielectric plate; 221: first surface; 222: second surface; 23: second feed member; and 24: second ground member.

DESCRIPTION OF EMBODIMENTS

In embodiments of this application, terms "first" and "second" are merely used for description, and shall not be understood as an indication or an implication of relative importance or an implicit indication of a quantity of indicated technical features. Therefore, features modified by "first" and "second" may explicitly indicate or implicitly include one or more such features.

In embodiments of this application, it should be noted that, unless otherwise specified, a term "electrical connection" indicates that current conduction is implemented in a direct connection mode.

In embodiments of this application, "and/or" describes only an association relationship for describing associated objects and represents that three relationships may exist. For example, A and/or B may represent the following three cases: Only A exists, both A and B exist, and only B exists. In addition, a character "/" in tins specification generally indicates an "or" relationship between associated objects.

Currently, an antenna is usually disposed inside an electronic device, and in particular, disposed inside a host of the electronic device, to protect the antenna by using a housing of the electronic device. However, if the antenna is disposed inside the electronic device, internal space of the electronic device is occupied, and consequently the electronic device cannot develop towards optimized functions and thinness. In addition, if the antenna is disposed inside the electronic device, a full metallization design cannot be implemented for the housing of the electronic device.

To resolve the foregoing problems, this application provides an electronic device. The electronic device is a type of electronic device including a display screen and a keyboard host that are rotatably connected to each other. Specifically, a structure form of the electronic device includes but is not limited to a notebook computer, a clamshell mobile phone, or a clamshell handheld personal computer.

Figure 1:
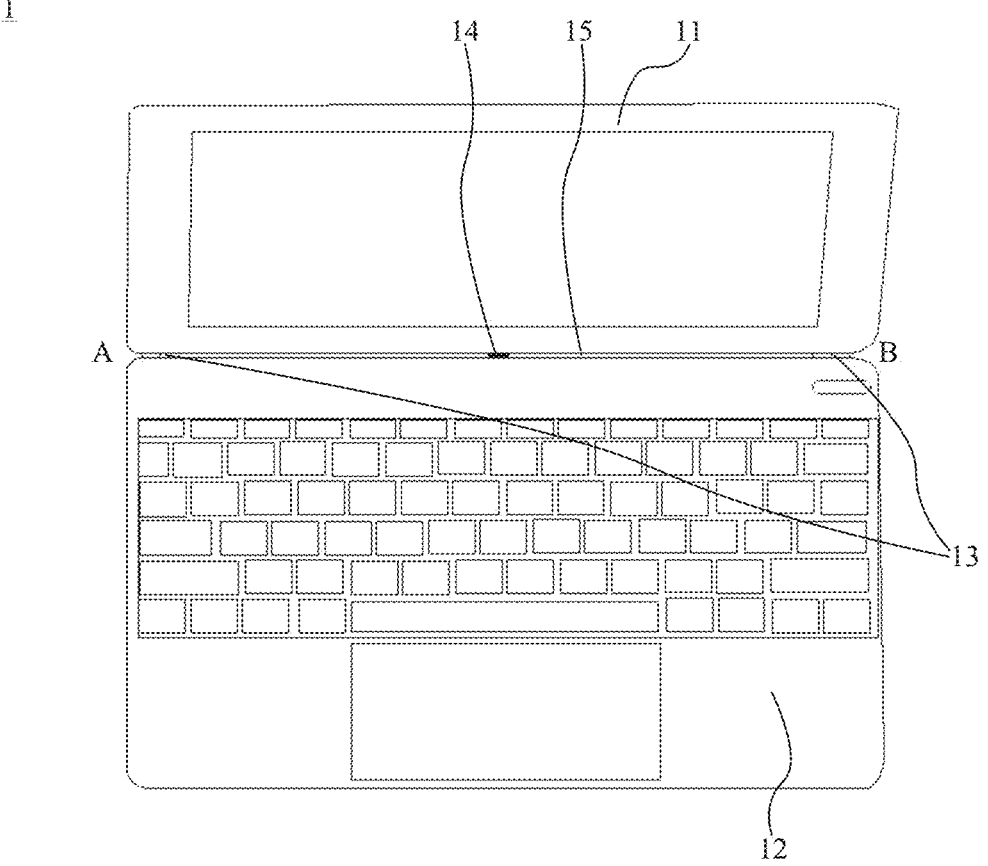
FIG. 1 is a schematic diagram of a structure of an electronic device according to some embodiments of this application.

FIG. 1 is a schematic diagram of a structure of an electronic device 1 according to some embodiments of this application. In this embodiment, the electronic device 1 is a notebook computer. The electronic device 1 includes a display screen 11, a keyboard host 12, a hinge 13, and an electrical connecting element 14.

The display screen 11 is configured to display an image, a video, and the like. The display screen 11 may be a flexible display screen, or may be a rigid display screen. For example, the display screen 11 may be an organic light-emitting diode (organic light-emitting diode, OLED) display, an active-matrix organic light-emitting diode (active-matrix organic light-emitting diode. AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light-emitting diode (quantum dot light-emitting diodes, QLED) display, or a liquid crystal display (liquid crystal display. LCD). A housing of the display screen 11 is a metal housing, and a material of the housing of the display screen 11 includes but is not limited to magnalium or titanium alloy.

The keyboard host 12 is configured to input an instruction and data, and control, based on the input instruction and data, the display screen 11 to display the image and the video. A housing of the keyboard host 12 is a metal housing, and a material of the housing of the keyboard host 12 includes but is not limited to magnalium or titanium alloy.

The hinge 13 is configured to rotatably connect the display screen 11 to the keyboard host 12, so that the electronic device switches between an open state and a closed state. When the electronic device is in the open state, the display screen 11 and the keyboard host 12 form an included angle greater than 90° and less than 180°, and the hinge 13 has a damping effect, so that the electronic device 1 can be kept at any open angular location. When the electronic device is in the closed state, the display screen 11 covers the keyboard host 12, and a display surface of the display screen 11 is opposite to a keyboard surface of the keyboard host 12. The hinge 13 is connected between the housing of the display screen 11 and the housing of the keyboard host 12. Certainly, the hinge 13 may be alternatively connected between another location of the display screen 11 and another location of the keyboard host 12. This is not specifically limited herein.

A main radiating slot 15 is formed between an edge that is of the display screen 11 and that is connected to the hinge 13 and an edge that is of the keyboard host 12 and that is connected to the hinge 13. To form the main radiating slot 15, the housing of the display screen 11 and the housing of the keyboard host 12 are metal housings, or only parts that are of the housing of the display screen 11 and the housing of the keyboard host 12 and that are on two sides of the main radiating slot 15 are made of metal, or the housing of one of the display screen 11 and the keyboard host 12 is a metal housing and a part that is of the housing of the other one of the display screen 11 and the keyboard host 12 and that is close to the main radiating slot 15 is made of metal. This is not specifically limited herein.

The electrical connecting element 14 passes through the main radiating slot 15 to electrically connect the display screen 11 to the keyboard host 12, so that the keyboard host 12 can control the display screen 11 to display the image and the video. The electrical connecting element 14 includes but is not limited to an electrical connection cable or an electrical connection spring plate, and the electrical connecting element 14 may pass through a middle part of the main radiating slot 15, or may pass through an edge of the main radiating slot 15. This is not specifically limited herein. A part that is of the electrical connecting element 14 and that passes through the main radiating slot 15 may be hidden in the hinge 13 or in a blocking member of the main radiating slot 15.

In this embodiment of this application, a feed member and a ground member are disposed in the main radiating slot 15, and locations of the feed member and the ground member relative to the electrical connecting element 14 are properly arranged, so that at least one slot antenna can be formed. In this way, communication between the electronic device and an external signal can be implemented by using the at least one slot antenna.

Figure 2:
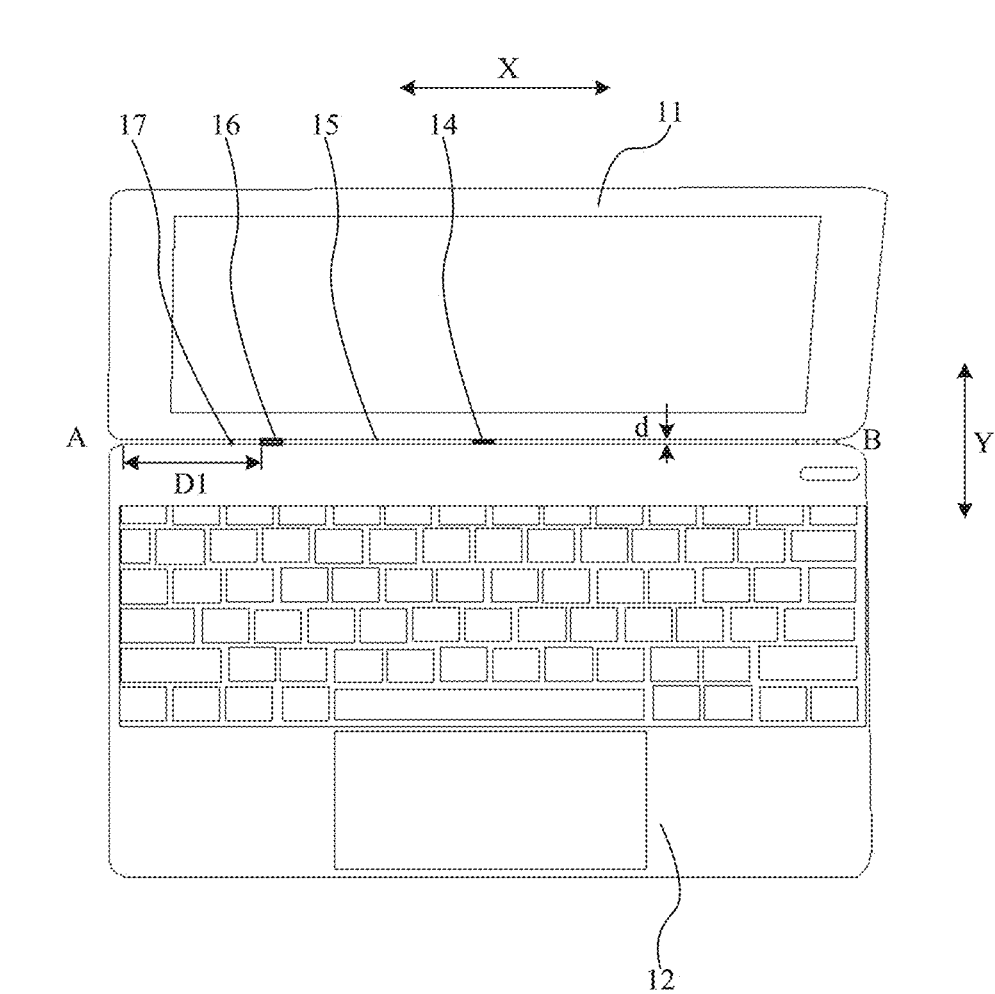
FIG. 2 is a schematic diagram of locations of a feed member and a ground member in an electronic device according to some embodiments of this application.

FIG. 2 is a schematic diagram of locations of a feed member and a ground member in an electronic device according to some embodiments of this application. The electronic device 1 further includes a first ground member 16 and a first feed member 17. The first ground member 16 and the first feed member 17 are disposed in the main radiating slot 15, the first ground member 16 and the first feed member 17 are disposed with an interval, and the first feed member 17 is located on a side that is of the first ground member 16 and that is far away from the electrical connecting element 14.

In this way, the housing of the display screen 11, the housing of the keyboard host 12, the first ground member 16, and the first feed member 17 form a first slot antenna. The following content is defined: Two ends of the main radiating slot 15 along a length direction of the main radiating slot 15 (that is, a direction X in FIG. 2) are a first end A and a second end B, the first end A and the first feed member 17 are located on a same side of the first ground member 16, and a length of the first slot antenna is a distance from the first ground member 16 to the first end A (that is, a distance D1 in FIG. 2). The length of the first slot antenna needs to satisfy a condition that the length is far greater than a width of the main radiating slot 15 (that is, a distance d in FIG. 2). The electronic device 1 is usually powered on for use and receives and sends signals by using the antenna only when the electronic device 1 is in the "open state". Therefore, the width of the radiating slot 15 is a width of the radiating slot 15 when the electronic device 1 is in the "open state". On a basis of satisfying this condition, the length D1 of the first slot antenna is approximately equal to ¼ times a resonance wavelength of the first slot antenna. The first slot antenna with a corresponding resonant frequency can be obtained by designing the location of the first ground member 16.

The hinge 13 is not shown in FIG. 2. Specifically, the hinge 13 may be a same structural member as the first ground member 16, may be a same structural member as the first feed member 17, or may be an independent structural member from both the first ground member 16 and the first feed member 17. This is not specifically limited herein. Specifically, a structure of the hinge 13 is also described in the following embodiments corresponding to the first ground member 16 and the first feed member 17.

The first ground member 16 is used for grounding. Because a housing of the electronic device 1 (including the housing of the display screen 11 and the housing of the keyboard host 12) is usually connected to a reference ground layer of a circuit board in the electronic device 1 on a common ground, the first ground member 16 may be electrically connected to a metal reference ground layer of a circuit board in the keyboard host 12 by using a ground connector, for example, a cable or a spring plate, to implement grounding, or may be directly electrically connected to the housing of the display screen 11 and/or the housing of the keyboard host 12 to implement grounding. This is not specifically limited herein.

In some embodiments, the first ground member 16 crosses the main radiating slot 15 along a width direction (that is, a direction Y in FIG. 2) of the main radiating slot 15, one end of the first ground member 16 is connected and electrically conducted to the housing of the display screen 11, and the other end of the first ground member 16 is connected and electrically conducted to the housing of the keyboard host 12. Therefore, the first ground member 16 is directly connected to the housing of the display screen 11 and the housing of the keyboard host 12 to implement grounding. No ground connector needs to be disposed in such a grounding manner, and therefore the structure is simple.

Both the first ground member 16 and the hinge 13 are located in the main radiating slot 15. The first ground member 16 may be a same structural member as the hinge 13, or may be independent of the hinge 13. This is not specifically limited herein.

Figure 3A:
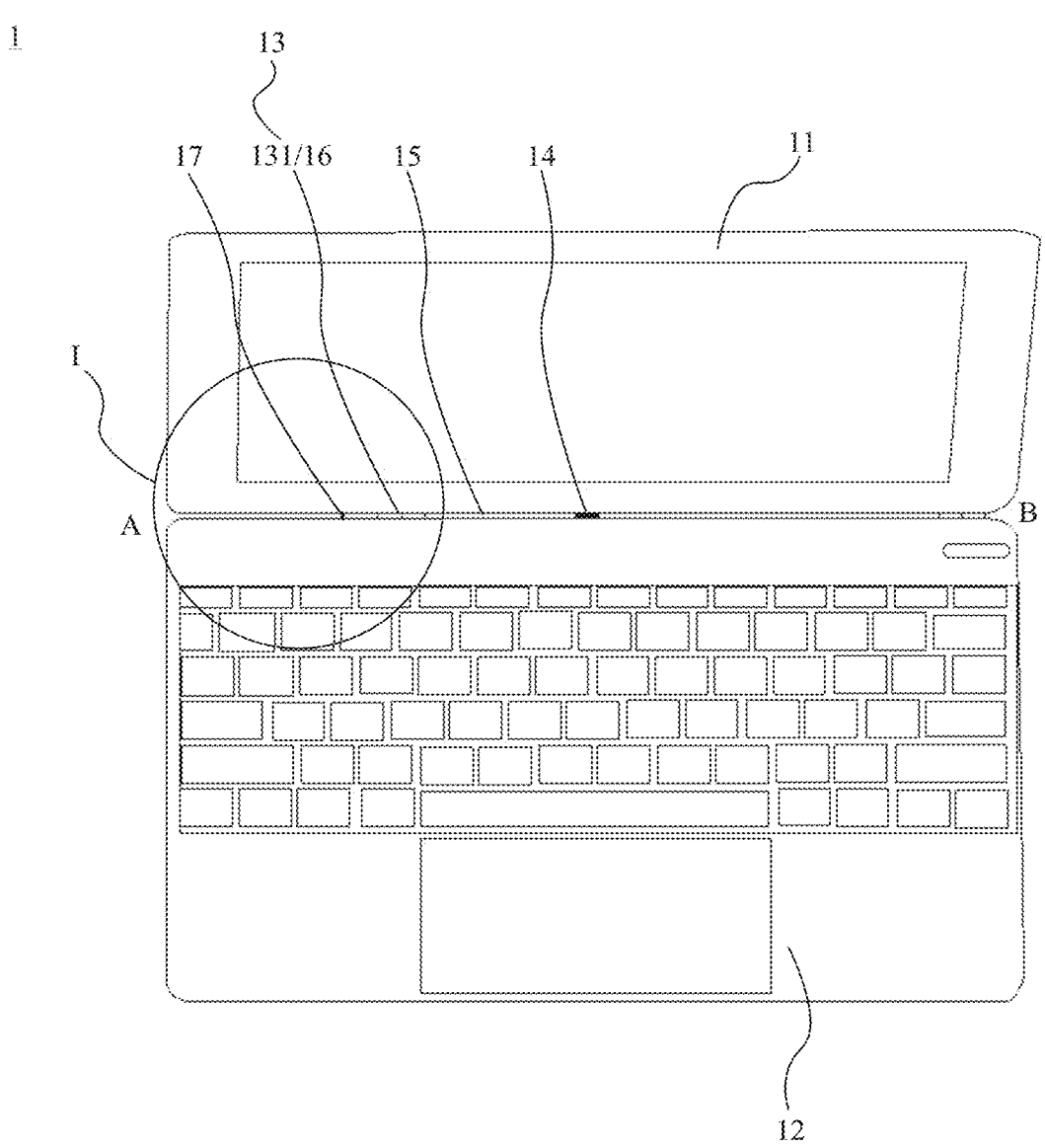
FIG. 3*a* is a schematic diagram of relative locations of a first ground member and a hinge in an electronic device according to some embodiments of this application.
Figure 3B:
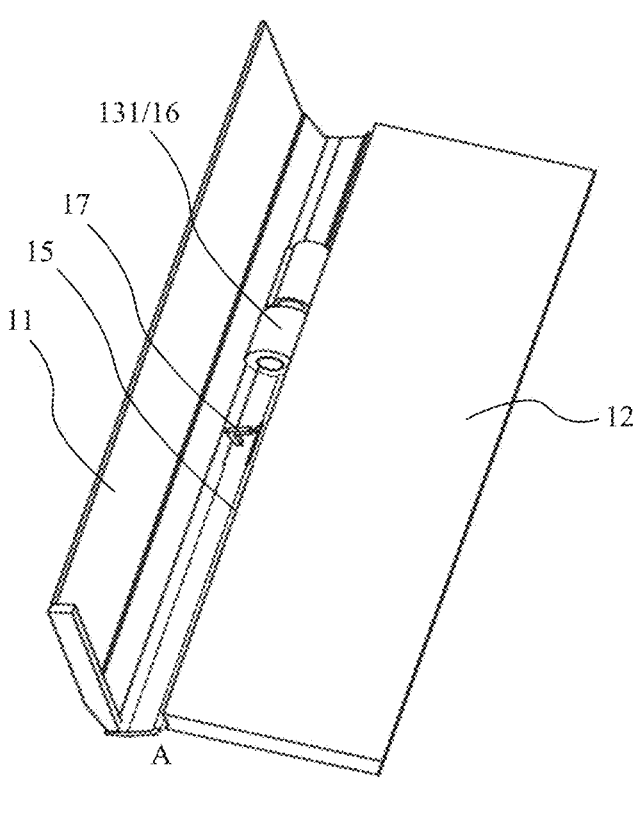
FIG. 3*b* is a three-dimensional diagram of an area I in FIG. 3*a;*

In some embodiments, refer to FIG. 3a and FIG. 3b. FIG. 3a is a schematic diagram of relative locations of a first ground member and a lunge in an electronic device according to some embodiments of this application, and FIG. 3b is a three-dimensional diagram of an area I in FIG. 3a. The hinge 13 includes a first hinge 131. An entire material of the first hinge 131 is a metal conductive material, for example, zinc alloy, steel, iron, or stainless steel, or a non-metal semiconductor material. The first hinge 131 constitutes the first ground member 16. In this way, the first ground member 16 and the first hinge 131 are a same structural member, so that a quantity of constituent structural members of the electronic device can be reduced, and structural complexity of the electronic device can be reduced. On this basis, to implement grounding of the first hinge 131, optionally, an end that is of the first hinge 131 and that is connected to the display screen 11 is connected and electrically conducted to the housing of the display screen 11, an end that is of the first hinge 131 and that is connected to the keyboard host 12 is connected and electrically conducted to the housing of the keyboard host 12. Such a structure is simple and is easy to implement.

In some other embodiments, the first ground member 16 is independent of the hinge 13. On this basis, a structure form of the first ground member 16 and connection modes between the first ground member 16 and the display screen 11 and between the first ground member 16 and the keyboard host 12 need to satisfy a condition that relative rotation between the display screen 11 and the keyboard host 12 is not affected. To satisfy this condition, for example, the first ground member 16 may be a flexible metal conductor such as a metal wire. One end of the first ground member 16 is connected to the display screen 11, and the other end of the first ground member 16 is connected to the keyboard host 12. In this way, the first ground member 16 can bend and deform to allow the display screen 11 to rotate relative to the keyboard host 12. For another example, the first ground member 16 is a rigid metal conductor. One end of the first ground member 16 is fastened to the keyboard host 12, the other end of the first ground member 16 is in rotatable contact with the display screen 11 by using an arc surface, and a center line corresponding to the arc surface is collinear with a rotation axial line of the hinge 13. In this way, the display screen 11 rotates relative to the first ground member 16 when rotating relative to the keyboard host 12. Therefore, the first ground member 16 does not affect relative rotation between the display screen 11 and the keyboard host 12.

The first ground member 16 is independent of the hinge 13. Specifically, the hinge 13 may be located on a side that is of the first ground member 16 and that is close to the first end A, or may be located on a side that is of the first ground member 16 and that is close to the second end B. This is not specifically limited herein. It should be noted that, when the hinge 13 is located on the side that is of the first ground member 16 and that is close to the second end B, whether the hinge 13 is a conductive member or an insulation member does not affect the first slot antenna.

Figure 4A:
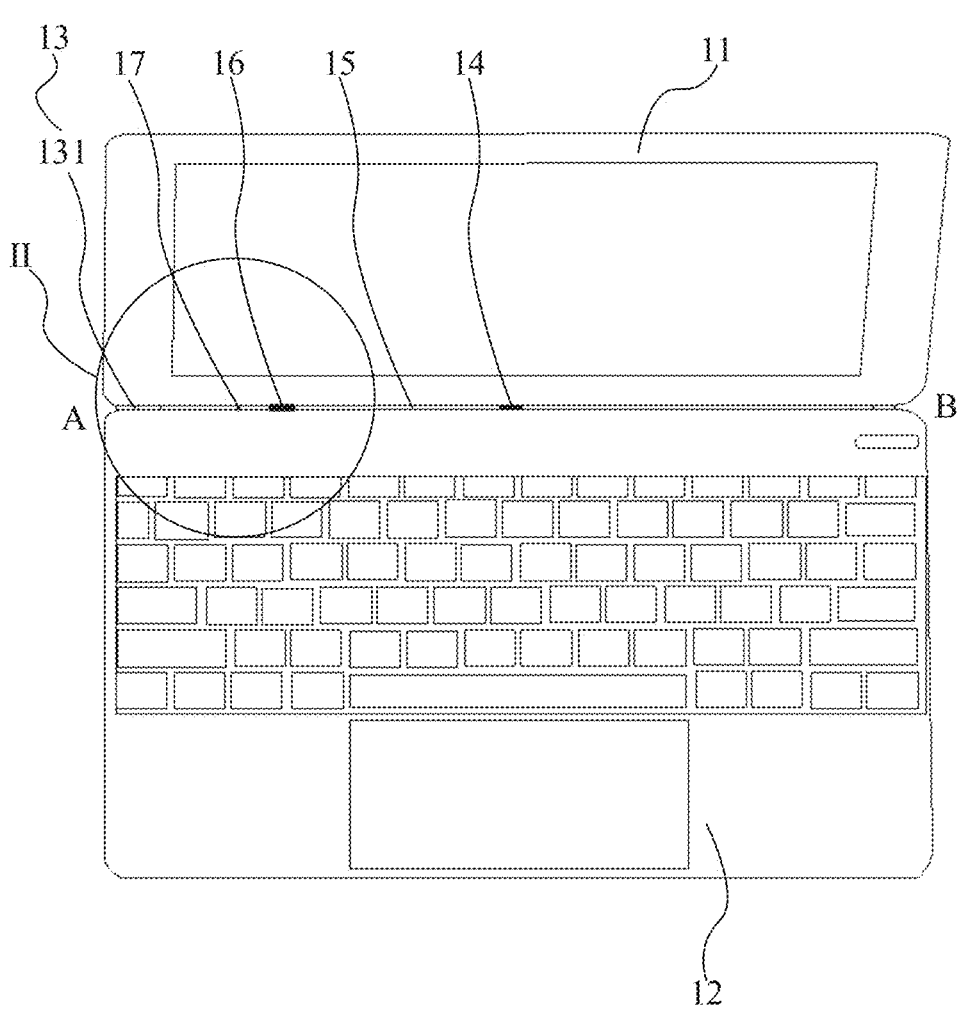
FIG. 4*a* is another schematic diagram of relative locations of a first ground member and a hinge in an electronic device according to some embodiments of this application.
Figure 4B:
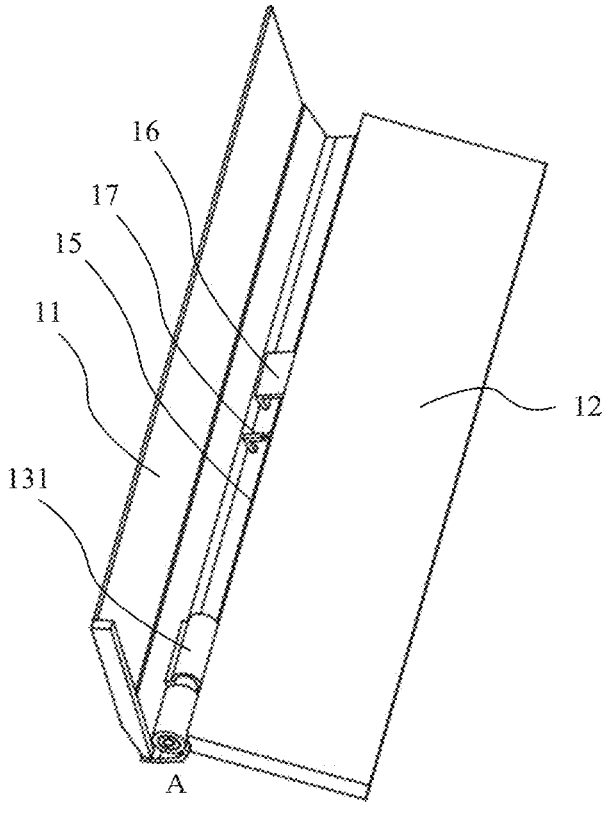
FIG. 4*b* is a three-dimensional diagram of an area II in FIG. 4*a;*

FIG. 4a is another schematic diagram of relative locations of a first ground member and a hinge in an electronic device according to some embodiments of this application, and FIG. 4b is a three-dimensional diagram of an area II in FIG. 4a. The hinge 13 includes a first hinge 131, and the first hinge 131 and the first feed member 17 are located on a same side of the first ground member 16. To be specific, the first hinge 131 is located on the side that is of the first ground member 16 and that is close to the first end A, or the first hinge 131 is directly located at the first end A. FIG. 4a and FIG. 4b provide only an example in which the first hinge 131 is located at the first end A, and cannot be considered as a particular limitation on this application. An entire material of the first hinge 131 is an insulation material, for example, plastic or ceramics. Alternatively, the first hinge 131 includes a first conductive part, a second conductive part, and an insulation part, the first conductive part of the first hinge 131 is connected to the housing of the display screen 11, the second conductive part of the first hinge 131 is connected to the housing of the keyboard host 12, and the first conductive part and the second conductive part are spaced apart by a specific distance and are connected through the insulation part. In this way, the first hinge 131 does not electrically connect the housing of the display screen 11 to the housing of the keyboard host 12, and the first hinge 131 does not close a radiation outlet of the first slot antenna (that is, an opening at the first end A of the main radiating slot), so that a signal of the first slot antenna can be radiated out through the radiation outlet.

Specifically, the insulation part may be a rotating shaft, a shaft sleeve, and parts in the rotating shaft and/or the shaft sleeve of the first hinge 131, provided that the insulation part can prevent a path that is between the housing of the display screen 11 and the housing of the keyboard host 12 and that is electrically conducted by the first hinge 131. This is not specifically limited herein.

Figure 5A:
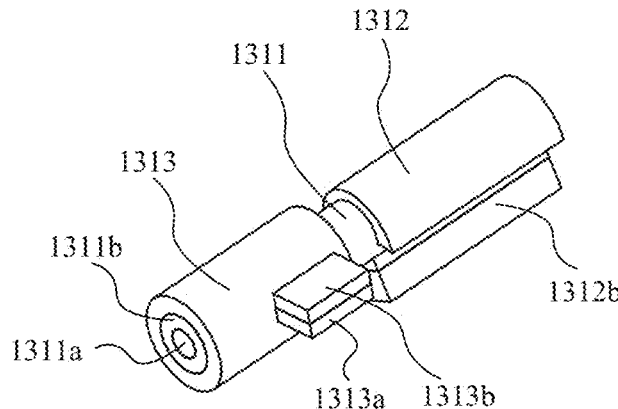
FIG. 5*a* is a three-dimensional diagram of a first hinge in an electronic device according to some embodiments of this application.
Figure 5B:
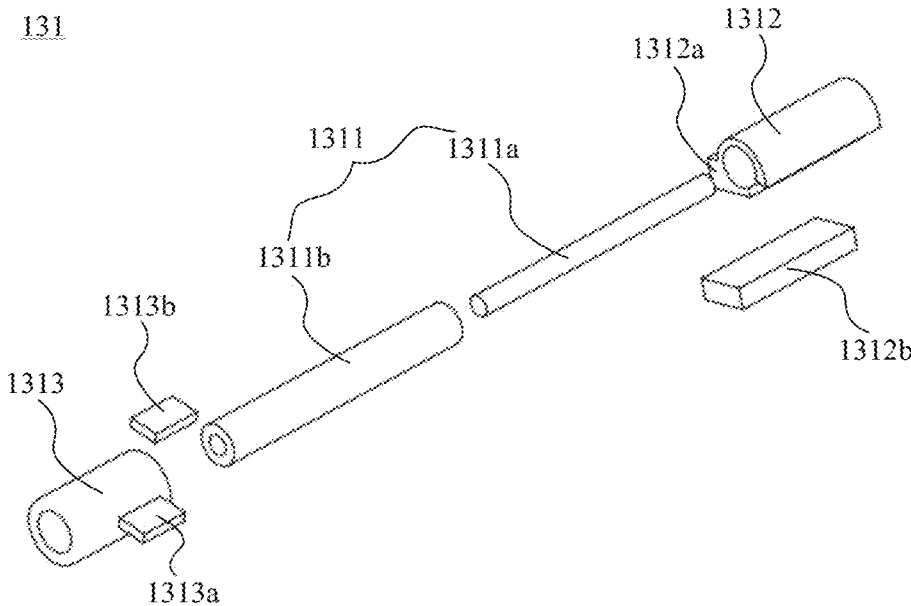
FIG. 5*b* is an exploded diagram of the first hinge shown in FIG. 5*a;*

FIG. 5a is a three-dimensional diagram of a first hinge in an electronic device according to some embodiments of this application, and FIG. 5b is an exploded diagram of the first hinge shown in FIG. 5a. The first hinge 131 includes a rotating shaft 1311, a first shaft sleeve 1312, and a second shaft sleeve 1313. The rotating shaft 1311 includes a rotating shaft main body 1311a made of a metal material and an insulation material layer 1311b disposed around a side wall of the rotating shaft main body 1311a. A material of the insulation material layer 1311b includes but is not limited to plastic, rubber, or silica gel, and the insulation material layer 1311b may be fastened around the side wall of the rotating shaft main body 1311a through coating, adhesion, sleeve, or the like. The insulation material layer 1311b and the rotating shaft main body 1311a jointly constitute the insulation part of the first hinge 131, and the rotating shaft 1311 is divided into a first section and a second section along a length direction of the rotating shaft 1311. Materials of the first shaft sleeve 1312 and the second shaft sleeve 1313 are metal materials, the first shaft sleeve 1312 constitutes the first conductive part of the first hinge 131, and the second shaft sleeve 1313 constitutes the second conductive part of the first hinge 131. The first shaft sleeve 1312 is connected to the housing of the display screen 11. In some embodiments, the first shaft sleeve 1312 has a first wing part 1312a, and the first shaft sleeve 1312 is connected to the housing of the display screen 11 through the first wing part 1312a. Optionally, a first bottom plate 1312b is disposed between the first wing part 1312a and the housing of the display screen 11. The second shaft sleeve 1313 is connected to the housing of the keyboard host 12. In some embodiments, the second shaft sleeve 1313 has a second wing part 1313a, and the second shaft sleeve 1313 is connected to the housing of the keyboard host 12 through the second wing part 1313a. Optionally, a second bottom plate 1313b is disposed between the second wing part 1313a and the housing of the keyboard host 12, the first shaft sleeve 1312 is sleeved on the first section of the rotating shaft 1311 in a fitted manner, the second shaft sleeve 1313 is sleeved on the second section of the rotating shaft 1311 in a fitted manner, and the first shaft sleeve 1312 and the second shaft sleeve 1313 are spaced from each other along an axial direction of the rotating shaft 1311. In tins way, the rotating shaft 1311 is insulated by using the insulation material layer 1311b, so that insulation can be implemented between the rotating shaft 1311 and the first shaft sleeve 1312 and between the rotating shaft 1311 and the second shaft sleeve 1313 on a premise of ensuring structural strength of the rotating shaft 1311. In addition, because the first shaft sleeve 1312 and the second shaft sleeve 1313 are spaced from each other along the axial direction of the rotating shaft 1311, the first shaft sleeve 1312 is insulated from the second shaft sleeve 1313. The insulation material layer 1311b and the rotating shaft main body 1311a jointly constitute the insulation part of the first hinge 131, and the insulation part can block the path that is between the housing of the display screen 11 and the housing of the keyboard host 12 and that is electrically conducted by the first hinge 131, to prevent the first hinge 131 from closing the radiation outlet of the first slot antenna. Such a structure is simple and is easy to implement.

In the foregoing embodiment, it should be noted that the material of the insulation material layer 1311b is an elastic material, for example, rubber or silica gel. On this basis, inner diameters of the first shaft sleeve 1312 and the second shaft sleeve 1313 may be designed to be less than an outer diameter of the rotating shaft 1311 when the insulation material layer 1311b is in a free state. In this way, when the first shaft sleeve 1312 and the second shaft sleeve 1313 are sleeved on the rotating shaft 1311, the insulation material layer 1311b is squeezed to generate elastic deformation, and elastic force generated by the insulation material layer 1311b through deformation can prevent the first shaft sleeve 1312 and the second shaft sleeve 1313 from rotating relative to the rotating shaft 1311. Therefore, the first hinge 131 having a damping effect is formed, so that the electronic device 1 can be kept at any open angular location.

Still with reference to FIG. 2, the first feed member 17 is configured to feed power to the main radiating slot 15. The first feed member 17 may be of a direct feed structure or a coupling feed structure. To implement impedance matching between the first slot antenna and a radio frequency front-end in the keyboard host 12, when the first feed member 17 is of a direct feed structure, the first feed member 17 is disposed close to the first reference ground 16; or when the first feed member 17 is of a coupling feed structure, the first feed member 17 is disposed close to the radiation outlet of the first slot antenna (that is, the opening at the first end A of the main radiating slot 15) or is directly located at the radiation outlet of the first slot antenna. Specifically, structure implementations of the first feed member 17 may include the following six implementations.

Figure 6:
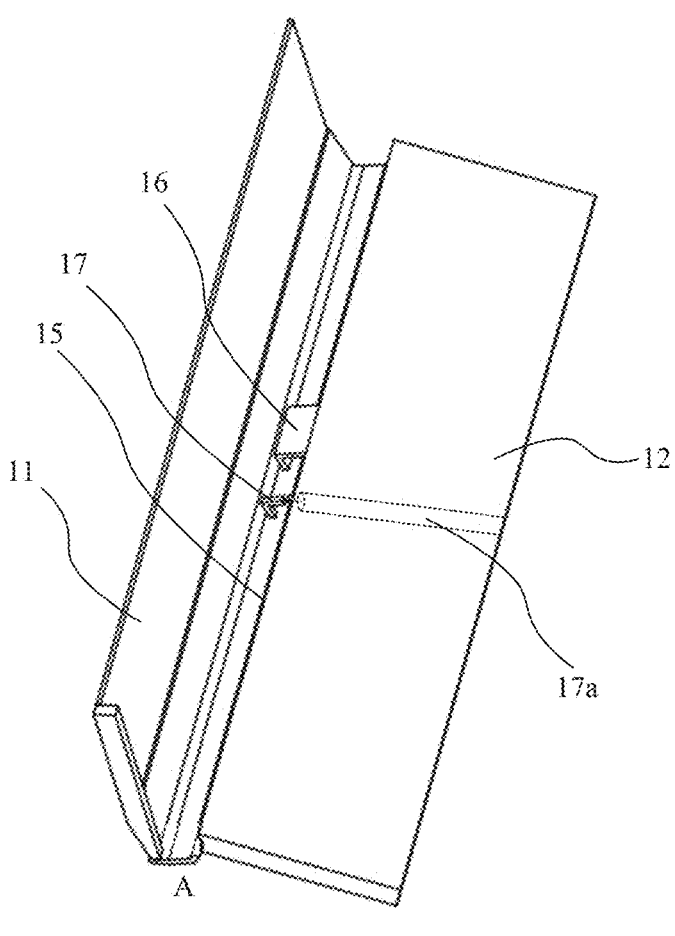
FIG. 6 is a schematic diagram of a structure of a first feed member in an electronic device according to some embodiments of this application.

For a first implementation, refer to FIG. 6. FIG. 6 is a schematic diagram of a structure of a first feed member in an electronic device according to some embodiments of this application. The first feed member 17 is a conductive member disposed between the display screen 11 and the keyboard host 12. An end that is of the first feed member 17 and that is close to the display screen 11 is electrically connected to the housing of the display screen 11, an end that is of the first feed member 17 and that is close to the keyboard host 12 is insulated from the housing of the keyboard host 12, the keyboard host 12 includes a first radio frequency front-end, and the first radio frequency front-end is electrically connected, through a feed structure 17a such as a coaxial cable or a microstrip, to the end that is of the first feed member 17 and that is close to the keyboard host 12. In some embodiments, the first radio frequency front-end includes a transmit channel and a receive channel. The transmit channel includes components such as a power amplifier and a filter. After the components such as the power amplifier and the filter perform power amplification, filtering, and other processing on a signal, a processed signal is transmitted from the first feed member 17 to the housing of the display screen 11, and then is transmitted from the housing of the display screen 11 to an external world. The receive channel includes components such as a low noise amplifier and a filter. After the components such as the low noise amplifier and the filter perform low noise amplification, filtering, and other processing on an external signal received by the housing of the display screen 11, a processed external signal is transmitted to a radio frequency chip. In tins way, communication between the electronic device and the external signal is implemented by using the housing of the display screen 11, the first feed member 17, and the first radio frequency front-end. The first radio frequency front-end is disposed in the housing of the keyboard host 12, and the first radio frequency front-end may be integrated on a mainboard in the keyboard host 12, or may be independent of the mainboard. This is not specifically limited herein. A structure form of the first feed member 17 is a direct feed structure, and such a structure is simple and is easy to implement.

In the foregoing embodiment, the first feed member 17 needs to satisfy a condition that relative rotation between the display screen 11 and the keyboard host 12 is not affected. To satisfy this condition, for example, the first feed member 17 is a flexible metal wire, and the flexible metal wire is easy to bend and deform and does not affect relative rotation between the display screen 11 and the keyboard host 12.

For another example, the first feed member 17 is of a rigid structure. In this case, the end that is of the first feed member 17 and that is close to the display screen 11 is fastened to the housing of the display screen 11, and a specific avoidance gap is maintained between the keyboard host 12 and the end that is of the first feed member 17 and that is close to the keyboard host 12. The avoidance gap can prevent the first feed member 17 from coming into contact with the keyboard host 12 when the first feed member 17 rotates with the display screen 11 relative to the keyboard host 12. In addition, the avoidance gap can implement insulation between the first feed member 17 and the housing of the keyboard host 12.

Figure 7:
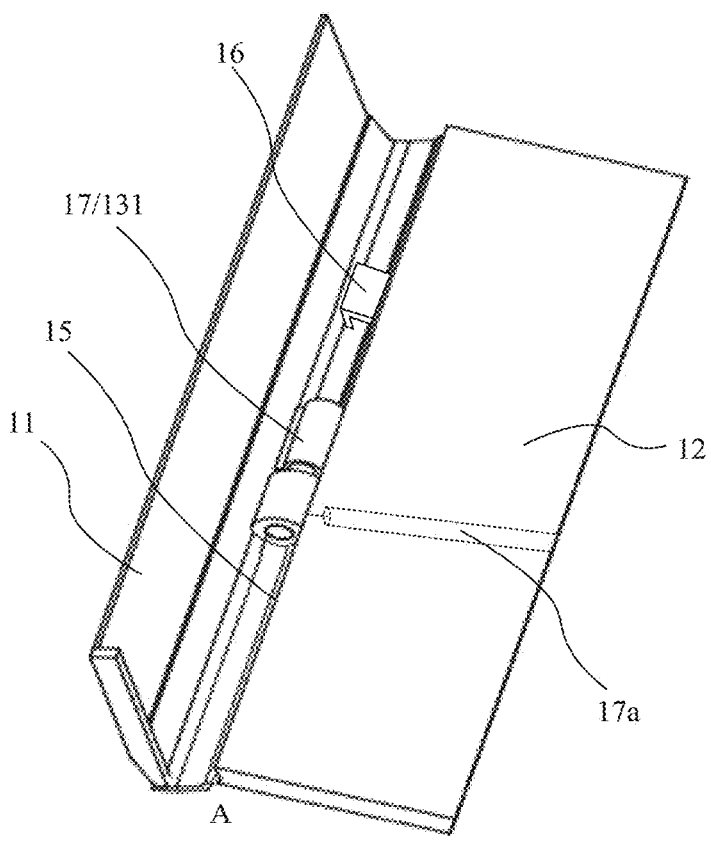
FIG. 7 is a schematic diagram of a structure of a first feed member in an electronic device according to some other embodiments of this application.

For still another example, refer to FIG. 7. FIG. 7 is a schematic diagram of a structure of a first feed member in an electronic device according to some other embodiments of this application. The hinge 13 includes a first hinge 131. The first hinge 131 and the first feed member 17 are located on a same side of the first ground member 16. An entire material of the first hinge 131 is a metal conductive material, for example, zinc alloy, steel, iron, or stainless steel, or a non-metal semiconductor material. An end that is of the first hinge 131 and that is connected to the display screen 11 is connected and electrically conducted to the housing of the display screen 11, and an end that is of the first hinge 131 and that is connected to the keyboard host 12 is connected to the housing of the keyboard host 12 in an insulated manner. "Connected in an insulated manner" means that two objects are connected together, but there is no current conduction between the two objects. In some embodiments, an insulation plate is disposed between the housing of the keyboard host 12 and the end that is of the first hinge 131 and that is connected to the keyboard host 12, and the end that is of the first hinge 131 and that is connected to the keyboard host 12, the insulation plate, and the housing of the keyboard host 12 are connected together through an insulation connector, for example, an insulation bolt. In this way, the end that is of the first hinge 131 and that is connected to the keyboard host 12 is connected to the housing of the keyboard host 12 in an insulated manner. The first hinge 131 constitutes the first feed member 17. In tis way, the first feed member 17 and the first hinge 131 are a same structural member, so that relative rotation between the display screen 11 and the keyboard host 12 is not affected, a quantity of constituent structural members of the electronic device can be reduced, and structural complexity of the electronic device can be reduced.

Figure 8:
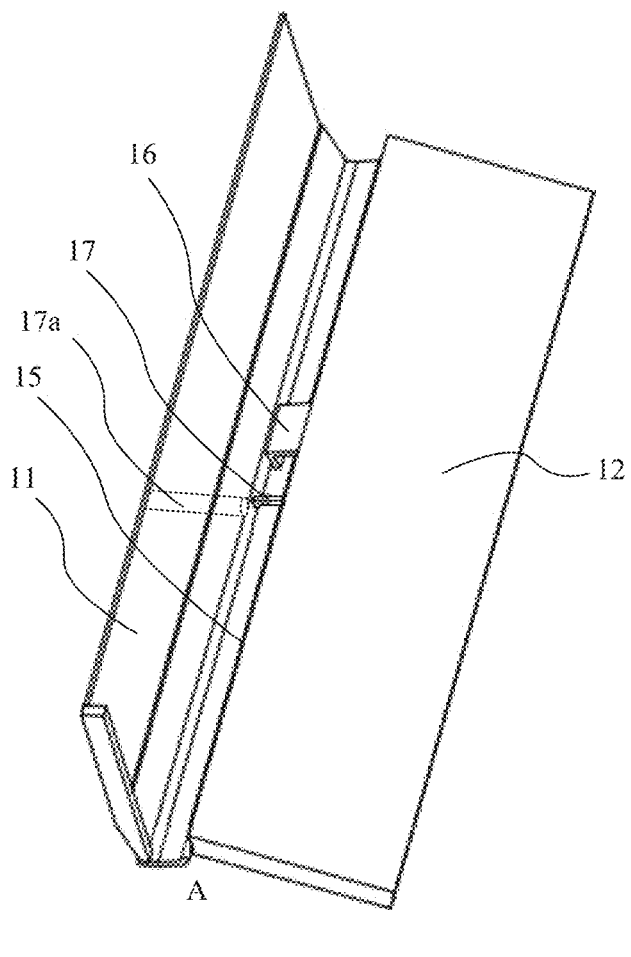
FIG. 8 is a schematic diagram of a structure of a first feed member in an electronic device according to some other embodiments of this application.

For a second implementation, refer to FIG. 8. FIG. 8 is a schematic diagram of a structure of a first feed member in an electronic device according to some other embodiments of this application. The first feed member 17 is a conductive member disposed between the display screen 11 and the keyboard host 12. An end that is of the first feed member 17 and that is close to the display screen 11 is insulated from the housing of the display screen 11, an end that is of the first feed member 17 and that is close to the keyboard host 12 is electrically connected to the housing of the keyboard host 12, the keyboard host 12 includes a first radio frequency front-end, and the first radio frequency front-end is electrically connected, through a feed structure 17a such as a coaxial cable or a microstrip, to the end that is of the first feed member 17 and that is close to the display screen 11. In some embodiments, the feed structure 17a is led out from the keyboard host 12, passes through the main radiating slot 15 on a side that is of the first ground member 16 and that is far away from the first feed member 17, extends into the housing of the display screen 11, and further extends out from a location that is of the housing of the display screen 11 and that is close to the first feed member 17, so that the feed structure 17a is electrically connected to the end that is of the first feed member 17 and that is close to the display screen 11. In some embodiments, a part that is of the feed structure 17a and that passes through the main radiating slot 15 may be hidden, together with the electrical connecting element 14, in the hinge 13 located on a side that is of the first ground member 16 and that is far away from the first feed member 17 or in a blocking member of the main radiating slot 15. In this way, the first radio frequency front-end feeds a radio frequency signal into the end that is of the first feed member 17 and that is close to the display screen 11, and transmits the radio frequency signal to the housing of the keyboard host 12 by using the first feed member 17, to radiate the radio frequency signal to an external environment by using the housing of the keyboard host 12. The first radio frequency front-end is further configured to receive a radio frequency signal received by the housing of the keyboard host 12. A structure form of the first feed member 17 is a direct feed structure, and such a structure is simple and is easy to implement.

In the foregoing embodiment, the first feed member 17 also needs to satisfy a condition that relative rotation between the display screen 11 and the keyboard host 12 is not affected. To satisfy this condition:

For example, the first feed member 17 is a flexible metal wire, and the flexible metal wire is easy to bend and deform and does not affect relative rotation between the display screen 11 and the keyboard host 12.

For another example, the first feed member 17 is of a rigid structure. In this case, the end that is of the first feed member 17 and that is close to the keyboard host 12 is fastened to the housing of the keyboard host 12, and a specific avoidance gap is maintained between the display screen 11 and the end that is of the first feed member 17 and that is close to the display screen 11. The avoidance gap can prevent the display screen 11 from coming into contact with the first feed member 17 when the display screen 11 rotates with the first feed member 17 relative to the keyboard host 12. In addition, the avoidance gap can implement insulation between the first feed member 17 and the housing of the display screen 11.

Figure 9:
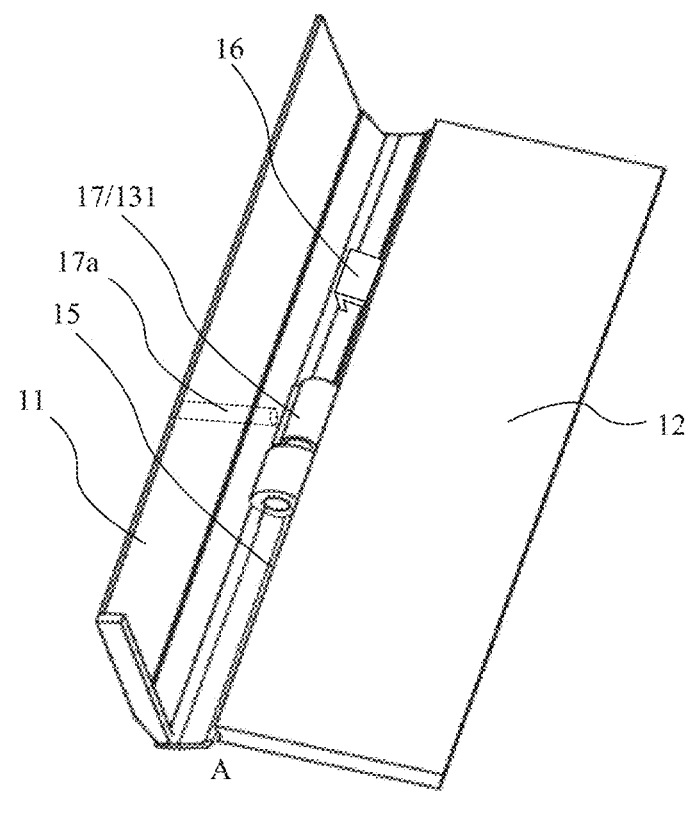
FIG. 9 is a schematic diagram of a structure of a first feed member in an electronic device according to some other embodiments of this application.

For still another example, refer to FIG. 9. FIG. 9 is a schematic diagram of a structure of a first feed member in an electronic device according to some other embodiments of this application. The hinge 13 includes a first hinge 131. The first hinge 131 and the first feed member 17 are located on a same side of the first ground member 16. An entire material of the first hinge 131 is a metal conductive material, for example, zinc alloy, steel, iron, or stainless steel, or a non-metal semiconductor material. An end that is of the first hinge 131 and that is connected to the keyboard host 12 is connected and electrically conducted to the housing of the keyboard host 12, and an end that is of the first hinge 131 and that is connected to the display screen 11 is connected to the housing of the display screen 11 in an insulated manner. In some embodiments, an insulation plate is disposed between the housing of the display screen 11 and the end that is of the first hinge 131 and that is connected to the display screen 11, and the end that is of the first hinge 131 and that is connected to the display screen 11, the insulation plate, and the housing of the display screen 11 are connected together through an insulation connector, for example, an insulation bolt. In this way, the first lunge 131 is connected to the housing of the display screen 11 in an insulated manner. The first hinge 131 constitutes the first feed member 17. In this way, the first feed member 17 and the first hinge 131 are a same structural member, so that relative rotation between the display screen 11 and the keyboard host 12 is not affected, a quantity of constituent structural members of the electronic device can be reduced, and structural complexity of the electronic device can be reduced.

Figure 10:
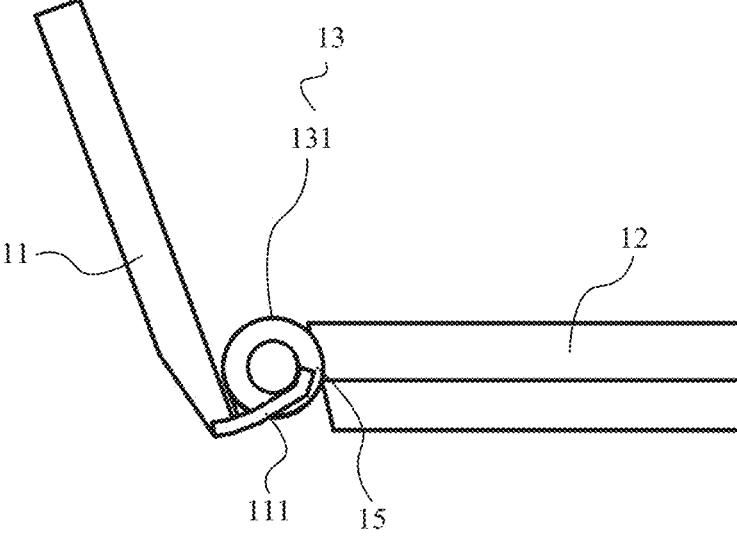
FIG. 10 is a side view of an electronic device according to some other embodiments of this application.
Figure 11:
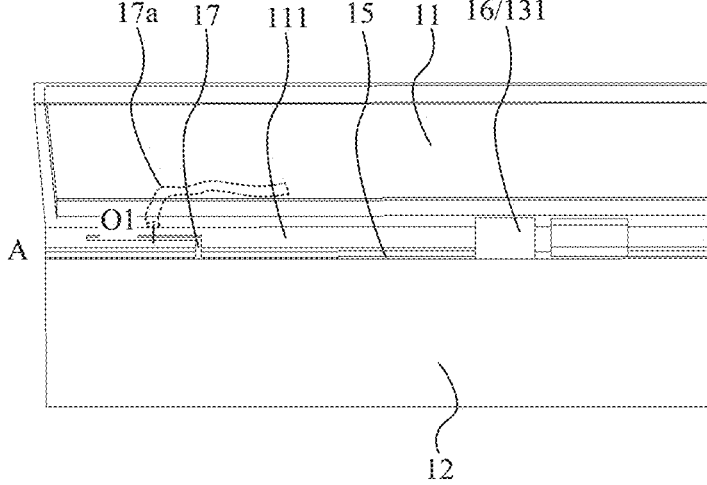
FIG. 11 is a main view of the electronic device shown in FIG. 10.

For a third implementation, refer to FIG. 10. FIG. 10 is a side view of an electronic device according to some other embodiments of this application. The display screen 11 includes a rotating shaft cover 111, the rotating shaft cover 111 is connected to the housing of the display screen 11, and the rotating shaft cover 11/ is located on an outer side of the hinge 13. The outer side of the hinge 13 is a side that is of the hinge 13 and that is far away from a first area, and the first area is an area formed by an included angle between the display surface of the display screen 11 and the keyboard surface of the keyboard host 12. The rotating shaft cover 111 is configured to cover a side surface of the keyboard host 12 when the electronic device is in the "closed state", to cover the hinge 13 and a connection slot between the display screen 11 and the keyboard host 12. A material of the rotating shaft cover 111 is a conductive material. In some embodiments, the material of the rotating shaft cover 11 is a metal conductive material. The rotating shaft cover 111 is electrically conducted to the housing of the display screen 11, and the main radiating slot 15 is formed between a rotating shaft cover edge that is of the rotating shaft cover 111 and that is far away from the display screen 11 and the keyboard host edge that is of the keyboard host 12 and that is close to the hinge 13. On this basis, refer to FIG. 11. FIG. 11 is a main view of the electronic device shown in FIG. 10. The first feed member 17 is a feed slot disposed on the rotating shaft cover 111, one end of the feed slot is closed, the other end of the feed slot is connected to the main radiating slot 15, the feed slot has a first feed point O1, the keyboard host 12 includes a first radio frequency front-end, and the first radio frequency front-end is electrically connected to the first feed point O1 through a feed structure 17a such as a coaxial cable or a microstrip. In some embodiments, the feed structure 17a is led out from the keyboard host 12, passes through the main radiating slot 15 on a side that is of the first ground member 16 and that is far away from the first feed member 17, extends into the housing of the display screen 11, and further extends out from a location that is of the housing of the display screen 11 and that is close to the first feed member 17, so that the feed structure 17a is electrically connected to the first feed point O1. In some embodiments, a part that is of the feed structure 17a and that passes through the main radiating slot 15 may be hidden, together with the electrical connecting element 14, in the hinge 13 located on a side that is of the first ground member 16 and that is far away from the first feed member 17 or in a blocking member of the main radiating slot 15. The first feed point O1 is not a point that actually exists, and a location at which the first radio frequency front-end is connected to the feed slot is the first feed point O1. In some embodiments, at the first feed point O1, a manner in which the feed structure 17a feeds the feed slot may be a cross-slot feed manner. Specifically, a signal cable and a ground conductor of the feed structure 17a are respectively connected to two points crossing the feed slot. In this way, the first radio frequency front-end feeds a radio frequency signal into the feed slot, and couples the radio frequency signal to the housing of the keyboard host 12 by using the feed slot, to radiate the radio frequency signal to an external environment by using the housing of the keyboard host 12. The first radio frequency front-end is further configured to receive a radio frequency signal received by the housing of the keyboard host 12. A structure form of the first feed member 17 is a coupling feed structure, and such a structure is simple and is easy to implement.

In the foregoing embodiment, a shape of the feed slot may be a straight line shape, an L shape, or another shape. FIG. 11 provides only an example in which the shape of the feed slot is an L shape, and cannot be considered as a particular limitation on the feed slot.

Figure 12:
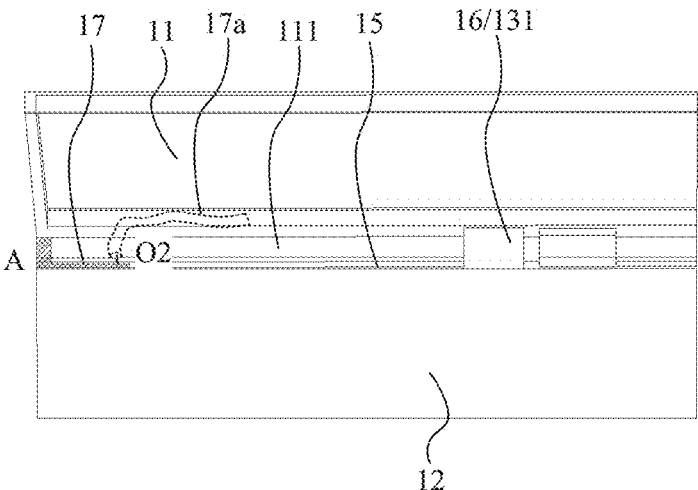
FIG. 12 is a schematic diagram of a structure of an electronic device according to some other embodiments of this application.

For a fourth implementation, refer to FIG. 12. FIG. 12 is a schematic diagram of a structure of an electronic device according to some other embodiments of this application. The display screen 11 includes a rotating shaft cover 111, the rotating shaft cover 111 is connected to the housing of the display screen 11, and the rotating shaft cover 111 is located on an outer side of the hinge 13. The outer side of the hinge 13 is a side that is of the hinge 13 and that is far away from a first area, and the first area is an area formed by an included angle between the display surface of the display screen 11 and the keyboard surface of the keyboard host 12. The rotating shaft cover 111 is configured to cover a side surface of the keyboard host 12 when the electronic device is in the "closed state", to cover the hinge 13 and a connection slot between the display screen 11 and the keyboard host 12. A material of the rotating shaft cover 111 is an insulation material. The main radiating slot 15 is formed between the housing of the display screen 11 and the housing of the keyboard host 12. On this basis, the first feed member 17 is a feed metal wire disposed on the rotating shaft cover 111. The feed metal wire may be a metal layer formed on the rotating shaft cover 111, or may be a metal sheet fastened to the rotating shaft cover 111. This is not specifically limited herein. In some embodiments, the feed metal wire is disposed on a surface that is of the rotating shaft cover 111 and that faces the hinge 13, to prevent the feed metal wire from being damaged because the feed metal wire is exposed outside the electronic device. An end of the feed metal wire is connected to the housing of the display screen 11, the feed metal wire has a second feed point O2, the keyboard host 12 includes a first radio frequency front-end, and the first radio frequency front-end is electrically connected to the second feed point O2 through a feed structure 17*a* such as a coaxial cable or a microstrip. In some embodiments, the feed structure 17*a* is led out from the keyboard host 12, passes through the main radiating slot 15 on a side that is of the first ground member 16 and that is far away from the first feed member 17, extends into the housing of the display screen 11, and further extends out from a location that is of the housing of the display screen 11 and that is close to the first feed member 17, so that the feed structure 17*a* is electrically connected to the second feed point O2. In some embodiments, a part that is of the feed structure 17*a* and that passes through the main radiating slot 15 may be hidden, together with the electrical connecting element 14, in the hinge 13 located on a side that is of the first ground member 16 and that is far away from the first feed member 17 or in a blocking member of the main radiating slot 15. The second feed point O2 is not a point that actually exists, and a location at which the first radio frequency front-end is connected to the feed metal wire is the second feed point O2. In this way, the first radio frequency front-end feeds a radio frequency signal into the feed metal wire, and couples the radio frequency signal to the housing of the keyboard host 12 by using the feed metal wire, to radiate the radio frequency signal to an external environment by using the housing of the keyboard host 12. The first radio frequency front-end is further configured to receive a radio frequency signal received by the housing of the keyboard host 12. A structure form of the first feed member 17 is a coupling feed structure, and such a structure is simple and is easy to implement.

In the foregoing embodiment, a shape of the feed metal wire may be a straight line shape, an L shape, or another shape. FIG. 12 provides only an example in which the shape of the feed metal wire is an L shape, and cannot be considered as a particular limitation on the feed metal wire.

Figure 13:
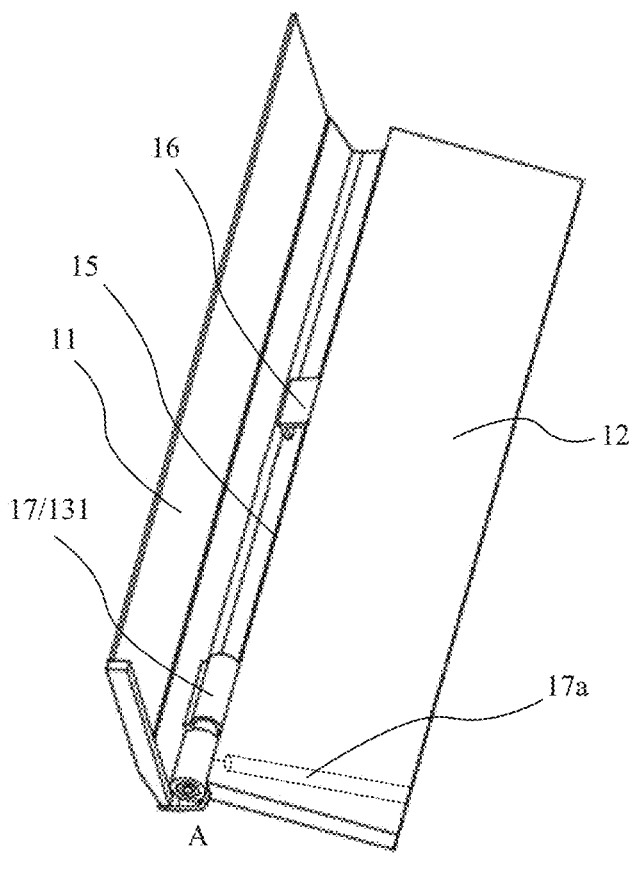
FIG. 13 is a schematic diagram of a structure of a first feed member in an electronic device according to some other embodiments of this application.

For a fifth implementation, refer to FIG. 13. FIG. 13 is a schematic diagram of a structure of a first feed member in an electronic device according to some other embodiments of this application. The hinge 13 includes a first hinge 131, and the first hinge 131 and the first feed member 17 are located on a same side of the first ground member 16. The first hinge 131 constitutes the first feed member 17. The first hinge 131 is of a structure shown in FIG. 5*a* and FIG. 5*b*. The first shaft sleeve 1312 and the second shaft sleeve 1313 are spaced from each other and disposed in an insulated manner. The first shaft sleeve 1312 of the first hinge 131 is connected and electrically conducted to the housing of the display screen 11, and the second shaft sleeve 1313 is connected to the housing of the keyboard host 12 in an insulated manner. In some embodiments, a first insulation plate is disposed between the second shaft sleeve 1313 and the housing of the keyboard host 12, and the second shaft sleeve 1313, the first insulation plate, and the housing of the keyboard host 12 are connected together through an insulation connector, for example, an insulation bolt. In this way, the second shaft sleeve 1313 is connected to the housing of the keyboard host 12 in an insulated manner. The keyboard host 12 includes a first radio frequency front-end, and the first radio frequency front-end is electrically connected to the second shaft sleeve 1313. In this way, the first radio frequency front-end feeds a radio frequency signal into the second shaft sleeve 1313, couples the radio frequency signal to the first shaft sleeve 1312 by using the second shaft sleeve 1313, and transmits the radio frequency signal to the housing of the display screen 11 by using the first shaft sleeve 1312, to radiate the radio frequency signal to an external environment by using the housing of the display screen 11. A structure form of the first feed member 17 is a coupling feed structure, and such a structure is simple and is easy to implement. In addition, the first feed member 17 and the first hinge 131 are a same structural member, so that a quantity of constituent structural members of the electronic device can be reduced, structural complexity of the electronic device can be reduced, and relative rotation between the display screen 11 and the keyboard host 12 is not affected.

Figure 14:
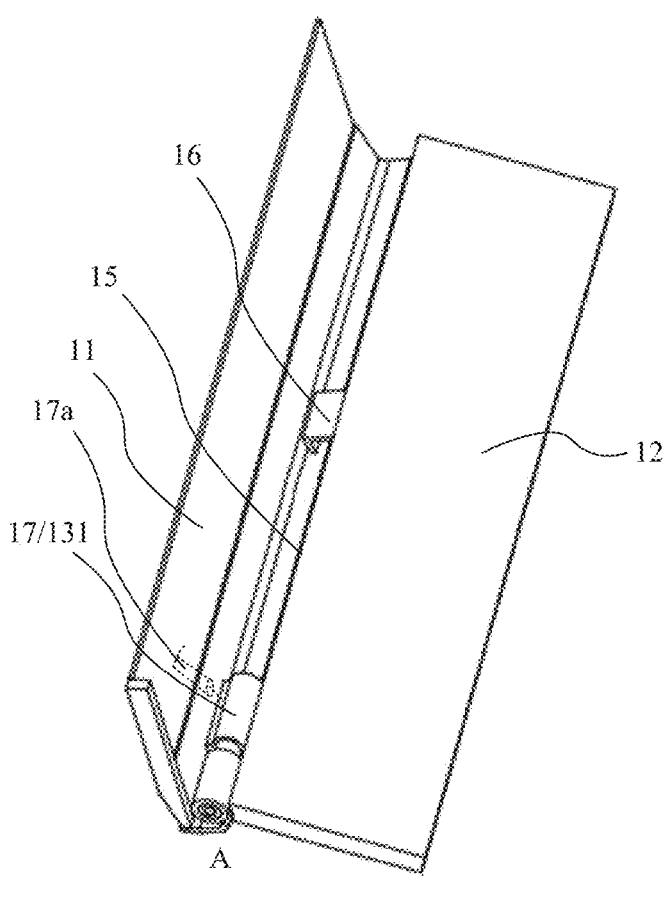
FIG. 14 is a schematic diagram of a structure of a first feed member in an electronic device according to some other embodiments of this application.

For a sixth implementation, refer to FIG. 14. FIG. 14 is a schematic diagram of a structure of a first feed member in an electronic device according to some other embodiments of this application. The hinge 13 includes a first hinge 131, and the first hinge 131 and the first feed member 17 are located on a same side of the first ground member 16. The first hinge 131 constitutes the first feed member 17. The first hinge 131 is of a structure shown in FIG. 5*a*. The first shaft sleeve 1312 and the second shaft sleeve 1313 of the first hinge 131 are spaced from each other and disposed in an insulated manner. The first shaft sleeve 1312 is connected to the housing of the display screen 11 in an insulated manner. In some embodiments, a second insulation plate is disposed between the first shaft sleeve 1312 and the housing of the display screen 11, and the first shaft sleeve 1312, the second insulation plate, and the housing of the display screen 11 are connected together through an insulation connector, for example, an insulation bolt. In this way, the first shaft sleeve 1312 is connected to the housing of the display screen 11 in an insulated manner. The second shaft sleeve 1313 is connected and electrically conducted to the housing of the keyboard host 12. The keyboard host 12 includes a first radio frequency front-end, and the rust radio frequency front-end is electrically connected to the first shaft sleeve 1312. In some embodiments, the feed structure 17*a* is led out from the keyboard host 12, passes through the main radiating slot 15 on a side that is of the first ground member 16 and that is far away from the first feed member 17, extends into the housing of the display screen 11, and further extends out from a location that is of the housing of the display screen 11 and that is close to the first feed member 17, so that the feed structure 17*a* is electrically connected to the first shaft sleeve 1312. In some embodiments, a part that is of the feed structure 17*a* and that passes through the main radiating slot

15 may be hidden, together with the electrical connecting element 14, in a blocking member of the main radiating slot 15. In this way, the first radio frequency front-end feeds a radio frequency signal into the first shaft sleeve 1312, couples the radio frequency signal to the second shaft sleeve 1313 by using the first shaft sleeve 1312, and transmits the radio frequency signal to the housing of the keyboard host 12 by using the second shaft sleeve 1313, to radiate the radio frequency signal to an external environment by using the housing of the keyboard host 12. A structure form of the first feed member 17 is a coupling feed structure, and such a structure is simple and is easy to implement. In addition, the first feed member 17 and the first hinge 131 are a same structural member, so that a quantity of constituent structural members of the electronic device can be reduced, structural complexity of the electronic device can be reduced, and relative rotation between the display screen 11 and the keyboard host 12 is not affected.

According to the foregoing descriptions of the implementations corresponding to the first ground member 16 and the first feed member 17, first slot antennas of a plurality of structures can be formed by combining different structure implementations of the first ground member 16 with different structure implementations of the first feed member 17.

Figure 15:
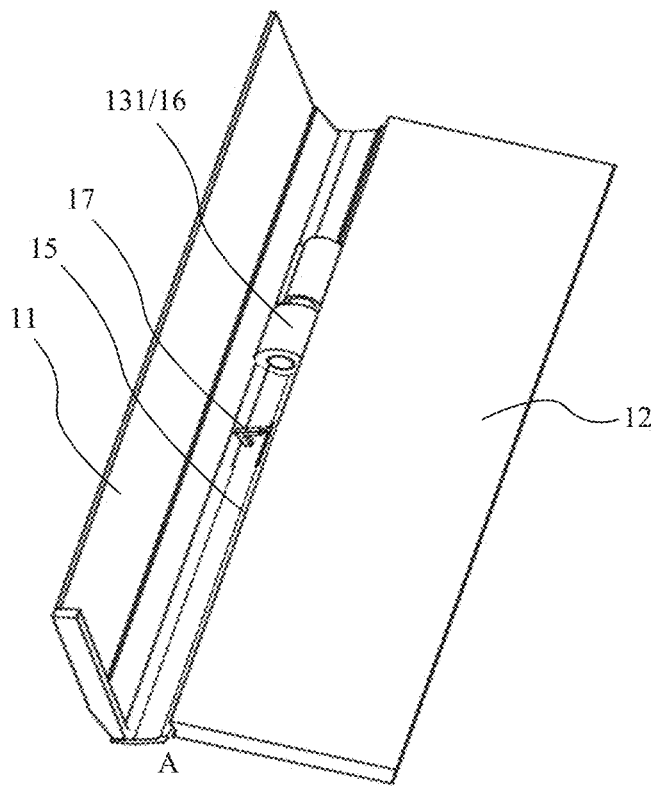
FIG. 15 is a schematic diagram of a structure of a first slot antenna in an electronic device according to some embodiments of this application.
Figure 16:
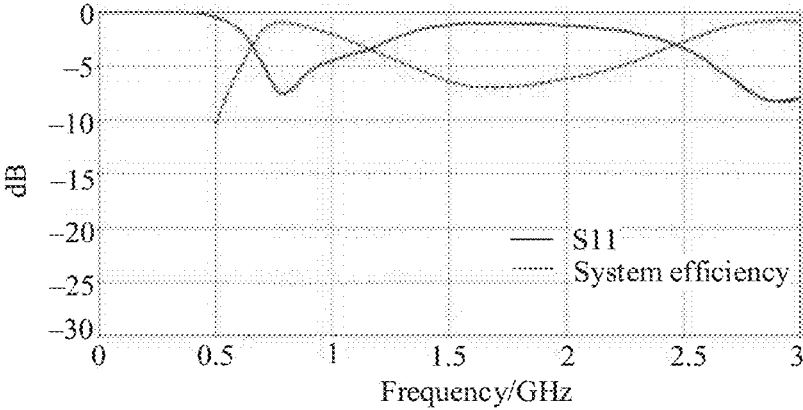
FIG. 16 is a diagram of an input return loss and a diagram of system efficiency of the first slot antenna shown in FIG. 15.

For example, refer to FIG. 15. FIG. 15 is a schematic diagram of a structure of a first slot antenna in an electronic device according to some embodiments of this application. A first ground member 16 is the first ground member 16 in the electronic device shown in FIG. 3*b*, and a first feed member 17 is the first feed member 17 in the foregoing first implementation. FIG. 16 is a diagram of an input return loss and a diagram of system efficiency of the first slot antenna shown in FIG. 15. In FIG. 16, a horizontal coordinate is a frequency (unit: GHz), a vertical coordinate is an input return loss coefficient (unit: dB), and S11 represents the input return loss of the first slot antenna. It can be learned from FIG. 16 that the first slot antenna can cover an entire low frequency band, has system efficiency meeting a requirement, and can be used to transmit or receive signals.

Figure 17:
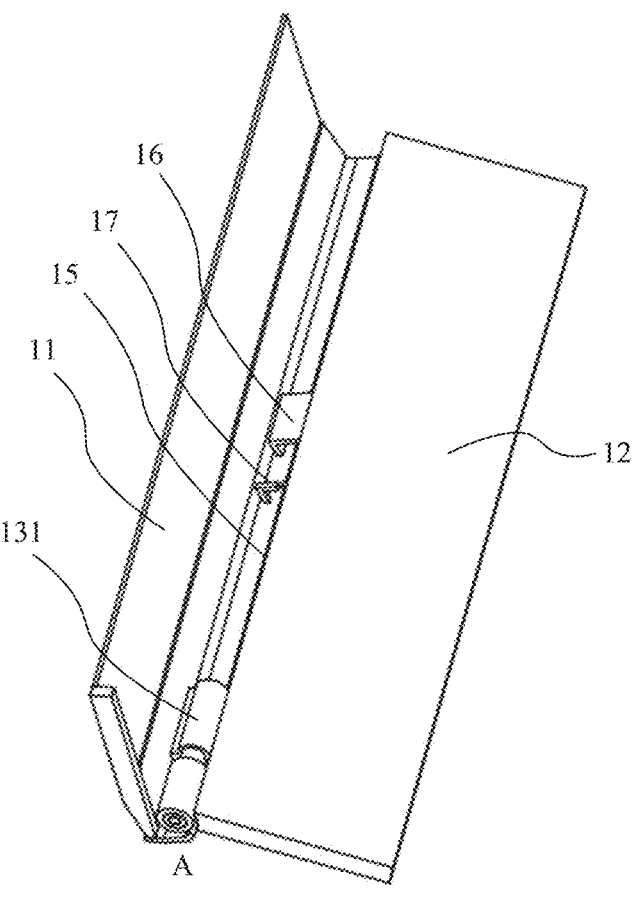
FIG. 17 is a schematic diagram of a structure of a first slot antenna in an electronic device according to some other embodiments of this application.
Figure 18:
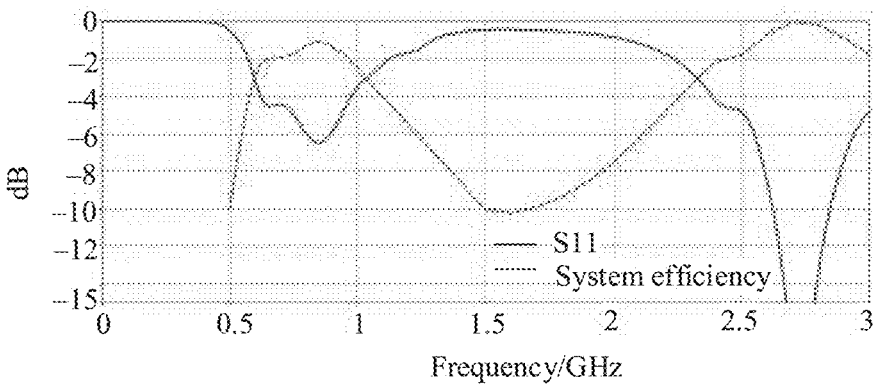
FIG. 18 is a diagram of an input return loss and a diagram of system efficiency of the first slot antenna shown in FIG. 17.

For another example, refer to FIG. 17. FIG. 17 is a schematic diagram of a structure of a first slot antenna in an electronic device according to some other embodiments of this application. Structures of the first ground member 16 and the first hinge 131 and a location relationship between them are respectively the same as the structures of the first ground member 16 and the first hinge 131 in the electronic device shown in FIG. 4*b* and the location relationship between them, and the first feed member 17 is the first feed member 17 in the foregoing first implementation. FIG. 18 is a diagram of an input return loss and a diagram of system efficiency of the first slot antenna shown in FIG. 17. In FIG. 18, a horizontal coordinate is a frequency (unit: GHz), a vertical coordinate is an input return loss coefficient (unit: dB), and S11 represents the input return loss of the first slot antenna. It can be learned from FIG. 18 that the first slot antenna can cover an entire low frequency band, has system efficiency meeting a requirement, and can be used to transmit or receive signals.

Figure 19:
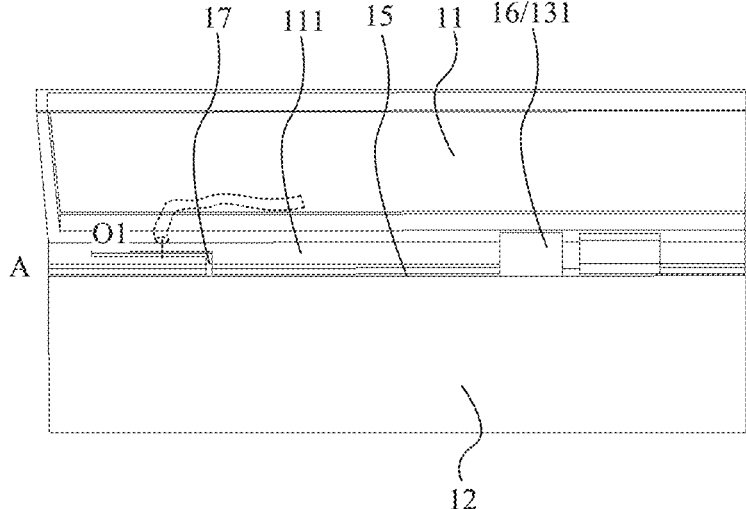
FIG. 19 is a schematic diagram of a structure of a first slot antenna in an electronic device according to some other embodiments of this application.
Figure 20:
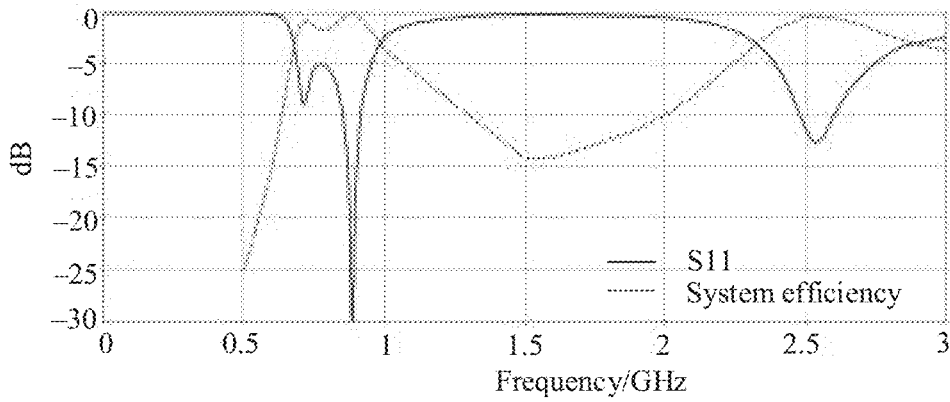
FIG. 20 is a diagram of an input return loss and a diagram of system efficiency of the first slot antenna shown in FIG. 19.

For another example, refer to FIG. 19. FIG. 19 is a schematic diagram of a structure of a first slot antenna in an electronic device according to some other embodiments of this application. A first ground member 16 is the first ground member 16 in the electronic device shown in FIG. 3*b*, and a first feed member 17 is the first feed member 17 in the foregoing third implementation. FIG. 20 is a diagram of an input return loss and a diagram of system efficiency of the first slot antenna shown in FIG. 19. In FIG. 20, a horizontal coordinate is a frequency (unit: GHz), a vertical coordinate is an input return loss coefficient (unit: dB), and S11 represents the input return loss of the first slot antenna. It can be learned from FIG. 20 that the first slot antenna can cover an entire low frequency band, has system efficiency meeting a requirement, and can be used to transmit or receive signals.

Figure 21:
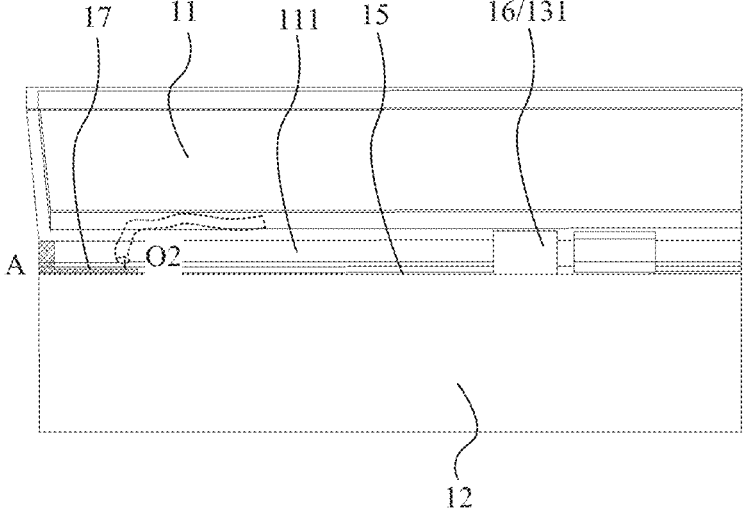
FIG. 21 is a schematic diagram of a structure of a first slot antenna in an electronic device according to some other embodiments of this application.
Figure 22:
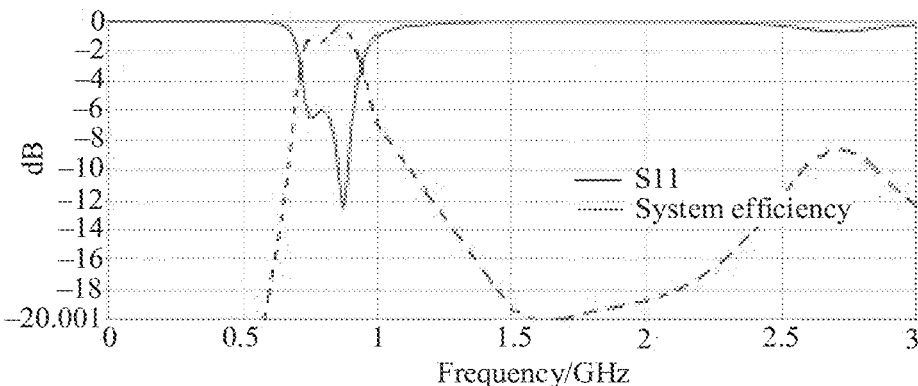
FIG. 22 is a diagram of an input return loss and a diagram of system efficiency of the first slot antenna shown in FIG. 21.

For another example, refer to FIG. 21. FIG. 21 is a schematic diagram of a structure of a first slot antenna in an electronic device according to some other embodiments of this application. A first ground member 16 is the first ground member 16 in the electronic device shown in FIG. 3*b*, and a first feed member 17 is the first feed member 17 in the foregoing fourth implementation FIG. 22 is a diagram of an input return loss and a diagram of system efficiency of the first slot antenna shown in FIG. 21. In FIG. 22, a horizontal coordinate is a frequency (unit: GHz), a vertical coordinate is an input return loss coefficient (unit: dB), and S11 represents the input return loss of the first slot antenna. It can be learned from FIG. 22 that the first slot antenna can cover an entire low frequency band, has system efficiency meeting a requirement, and can be used to transmit or receive signals.

Figure 23:
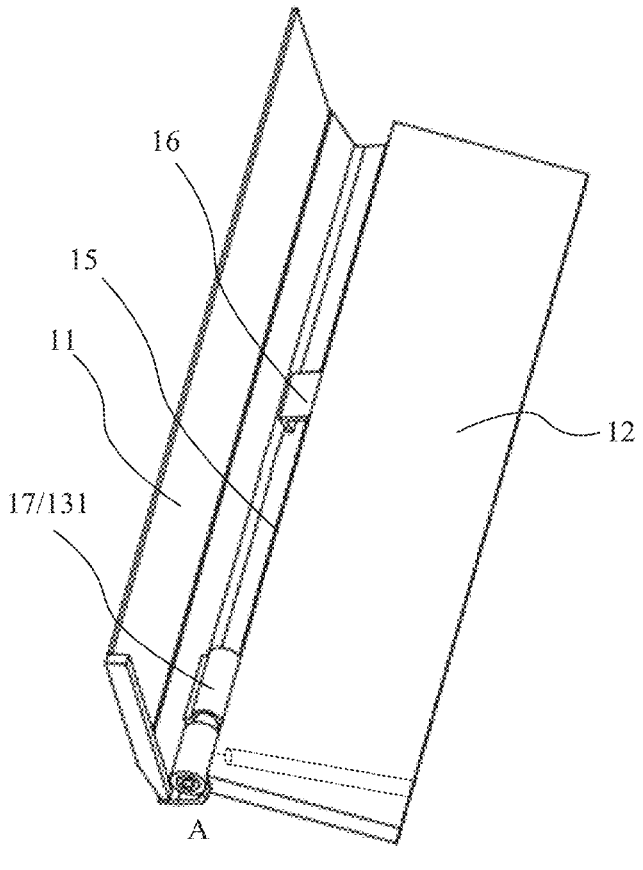
FIG. 23 is a schematic diagram of a structure of a first slot antenna in an electronic device according to some other embodiments of this application.
Figure 24:
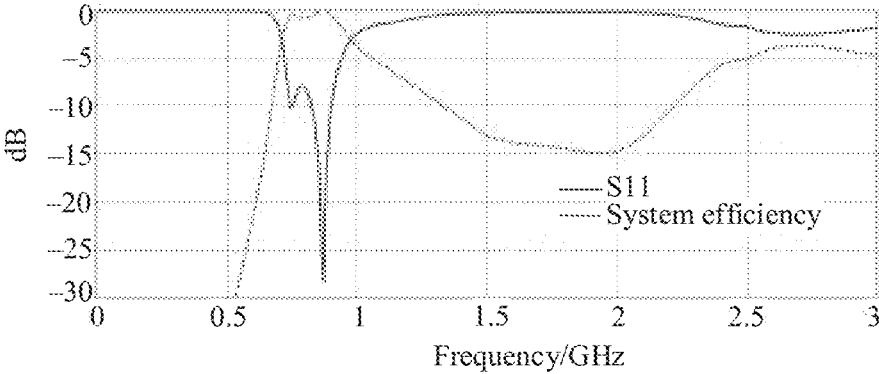
FIG. 24 is a diagram of an input return loss and a diagram of system efficiency of the first slot antenna shown in FIG. 23.

For another example, refer to FIG. 23. FIG. 23 is a schematic diagram of a structure of a first slot antenna in an electronic device according to some other embodiments of this application. A first ground member 16 is the first ground member 16 in the electronic device shown in FIG. 4*b*, and a first feed member 17 is the first feed member 17 in the foregoing fifth implementation. FIG. 24 is a diagram of an input return loss and a diagram of system efficiency of the first slot antenna shown in FIG. 23. In FIG. 24, a horizontal coordinate is a frequency (unit: GHz), a vertical coordinate is an input return loss coefficient (unit: dB), and S11 represents the input return loss of the first slot antenna. It can be learned from FIG. 24 that the first slot antenna can cover an entire low frequency band, has system efficiency meeting a requirement, and can be used to transmit or receive signals.

Figure 25:
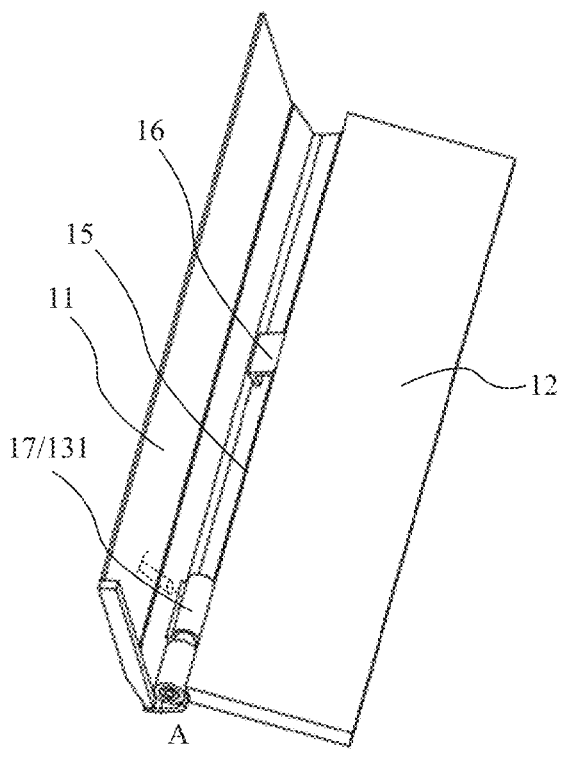
FIG. 25 is a schematic diagram of a structure of a first slot antenna in an electronic device according to some other embodiments of this application.
Figure 26:
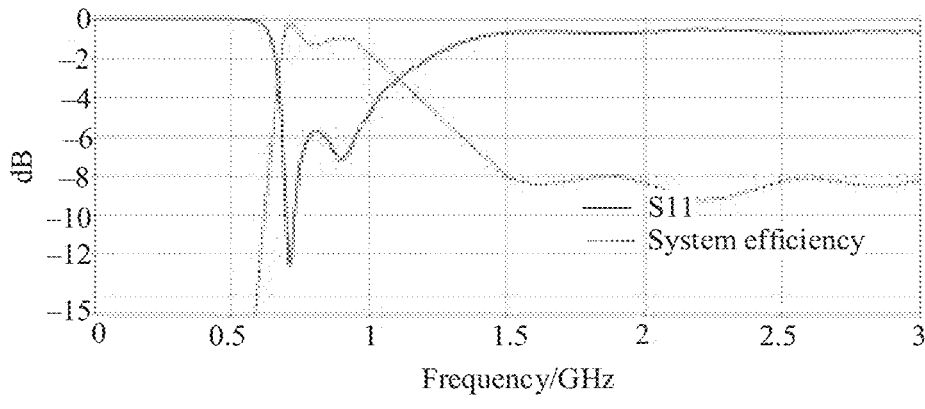
FIG. 26 is a diagram of an input return loss and a diagram of system efficiency of the first slot antenna shown in FIG. 25.

For another example, refer to FIG. 25. FIG. 25 is a schematic diagram of a structure of a first slot antenna in an electronic device according to some other embodiments of this application. A first ground member 16 is the first ground member 16 in the electronic device shown in FIG. 4*b*, and a first feed member 17 is the first feed member 17 in the foregoing with implementation. FIG. 26 is a diagram of an input return loss and a diagram of system efficiency of the first slot antenna shown in FIG. 25. In FIG. 26, a horizontal coordinate is a frequency (unit: GHz), a vertical coordinate is an input return loss coefficient (unit: dB), and S11 represents the input return loss of the first slot antenna. It can be learned from FIG. 26 that the first slot antenna can cover an entire low frequency band, has system efficiency meeting a requirement, and can be used to transmit or receive signals.

Figure 27:
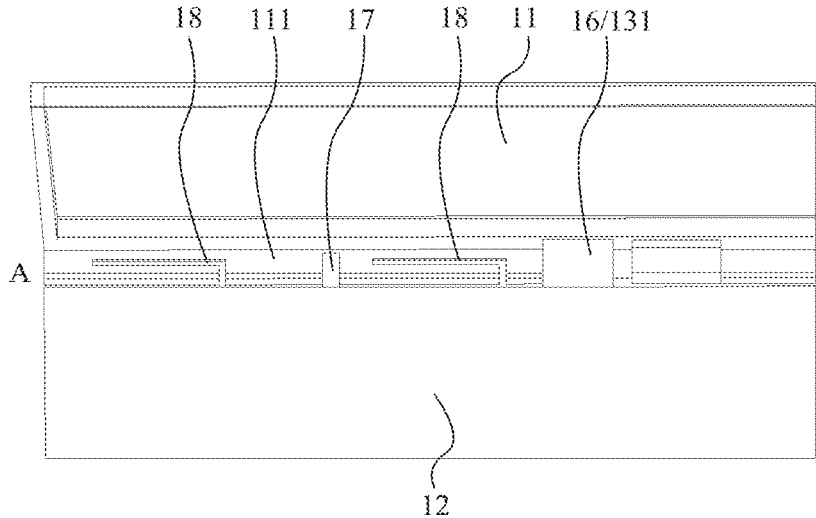
FIG. 27 is a schematic diagram of a structure of a first slot antenna in an electronic device according to some other embodiments of this application.

To increase bandwidth of the first slot antenna, a parasitic radiating slot or a parasitic radiator may be disposed on a part that is of the main radiating slot 15 and that is located between the first ground member 16 and the first end A, thereby increasing a quantity of resonance points of the first slot antenna. Specifically:

In some embodiments, refer to FIG. 27. FIG. 27 is a schematic diagram of a structure of a first slot antenna in an electronic device according to some other embodiments of this application. The display screen 11 includes a rotating shaft cover 111, the rotating shaft cover 111 is connected to the housing of the display screen 11, and the rotating shaft cover 111 is located on an outer side of the hinge 13. The outer side of the hinge 13 is a side that is of the hinge 13 and that is far away from a first area, and the first area is an area formed by an included angle between the display surface of the display screen 11 and the keyboard surface of the keyboard host 12. The rotating shaft cover 111 is configured to cover a side surface of the keyboard host 12 when the electronic device is in the "closed state", to cover the hinge 13 and a connection slot between the display screen 11 and the keyboard host 12. A material of the rotating shaft cover 111 is a conductive material. In some embodiments, the material of the rotating shaft cover 111 is a metal conductive material. The rotating shaft cover 111 is electrically conducted to the housing of the display screen 11, and the main radiating slot 15 is formed between an edge that is of the rotating shaft cover 11*l* and that is far away from the housing of the display screen 11 and the edge that is of the keyboard host 12 and that is close to the hinge 13. At least one parasitic radiating slot 18 is disposed on the rotating shaft cover 111, where "the at least one" means one, two, or more. FIG. 15 shows only an example in which there are two parasitic radiating slots 18. One end of the parasitic radiating slot 18 is closed, the other end of the parasitic radiating slot 18 is connected to the main radiating slot 15, and the at least one parasitic radiating slot 18 and the first feed member 17 are located on a same side of the first ground member 16. In tins way, the parasitic radiating slot 18 is an added parasitic radiating slot in the first slot antenna other than the main radiating slot. Therefore, a quantity of resonance points of the first slot antenna can be increased, and bandwidth of the first slot antenna can be increased.

Figure 30:
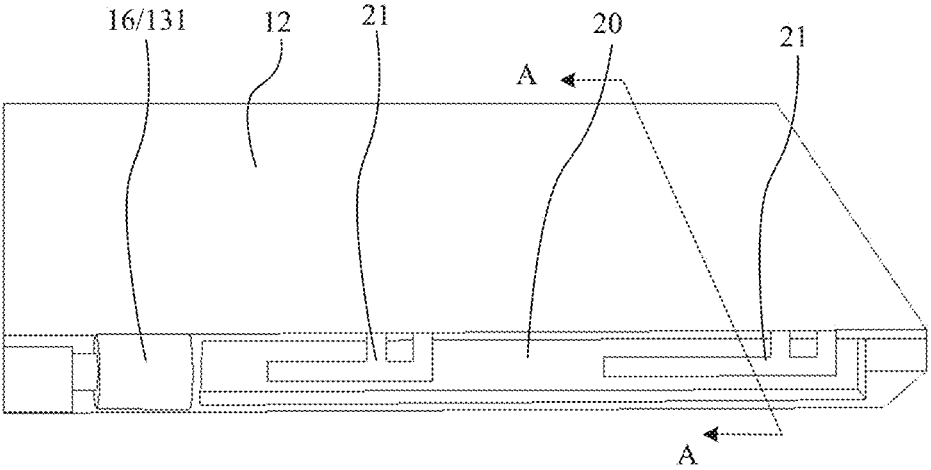
FIG. 30 is a schematic diagram of a structure of a surface that is of a keyboard host in an electronic device and that faces a main radiating slot according to some other embodiments of this application.

In the foregoing embodiment, the parasitic radiating slot 18 may be a straight-line slot, an L-shaped slot, or the like. FIG. 30 provides only an example in which the parasitic radiating slot 18 is an L-shaped slot, and cannot be considered as a particular limitation on this application.

Figure 28:
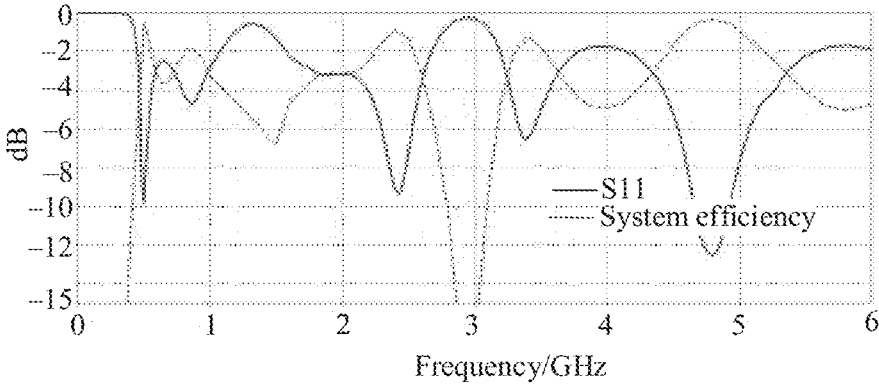
FIG. 28 is a diagram of an input return loss and a diagram of system efficiency of the first slot antenna shown in FIG. 27.

FIG. 28 is a diagram of an input return loss and a diagram of system efficiency of the first slot antenna shown in FIG. 2'7. In FIG. 28, a horizontal coordinate is a frequency (unit: GHz), a vertical coordinate is an input return loss coefficient (unit: dB), and S11 represents the input return loss of the first slot antenna. It can be learned from FIG. 28 that the first slot antenna has a plurality of resonance points, and system efficiency at the plurality of resonance points meets a requirement. Therefore, bandwidth is high, and requirements of an MHB antenna, a 5G antenna, and a sub-6G antenna can be met.

Figure 29:
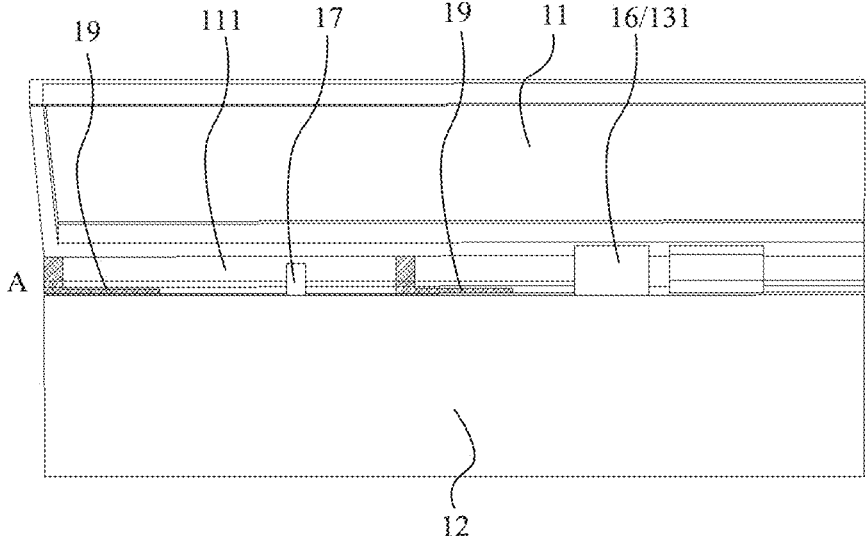
FIG. 29 is a schematic diagram of a structure of a first slot antenna in an electronic device according to some other embodiments of this application.
Figure 32:
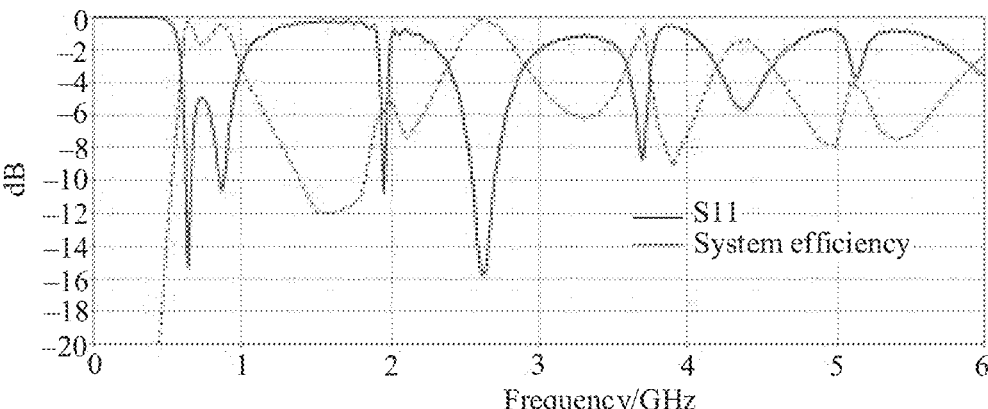
FIG. 32 is a diagram of an input return loss and a diagram of system efficiency of the first slot antenna shown in FIG. 30 and FIG. 31.

In some other embodiments, refer to FIG. 29. FIG. 29 is a schematic diagram of a structure of a first slot antenna in an electronic device according to some other embodiments of this application. The display screen 11 includes a rotating shaft cover 111, the rotating shaft cover 111 is connected to the housing of the display screen 11, and the rotating shaft cover 111 is located on an outer side of the hinge 13. The outer side of the hinge 13 is a side that is of the hinge 13 and that is far away from a first area, and the first area is an area formed by an included angle between the display surface of the display screen 11 and the keyboard surface of the keyboard host 12. The rotating shaft cover 111 is configured to cover a side surface of the keyboard host 12 when the electronic device is in the "closed state", to cover the hinge 13 and a connection slot between the display screen 11 and the keyboard host 12. A material of the rotating shaft cover 111 is an insulation material. The main radiating slot 15 is formed between the housing of the display screen 11 and the housing of the keyboard host 12. On this basis, at least one first parasitic radiator 19 is disposed on the rotating shaft cover 111, where "the at least one" means one, two, or more. FIG. 32 shows only an example in which there are two first parasitic radiators 19. A ground end of the first parasitic radiator 19 is connected to the housing of the display screen

11, and the at least one first parasitic radiator 19 and the first feed member 17 are located on a same side of the first ground member 16. In this way, the first parasitic radiator 19 is an added parasitic radiator in the first slot antenna other than the main radiating slot. Therefore, a quantity of resonance points of the first slot antenna can be increased, and bandwidth of the first slot antenna can be increased.

In the foregoing embodiment, the first parasitic radiator 19 may be a straight-line radiator, an L-shaped radiator, an F-shaped radiator, or the like. FIG. 29 provides only an example in which the first parasitic radiator 19 is an L-shaped radiator, and cannot be considered as a particular limitation on this application.

Figure 33:
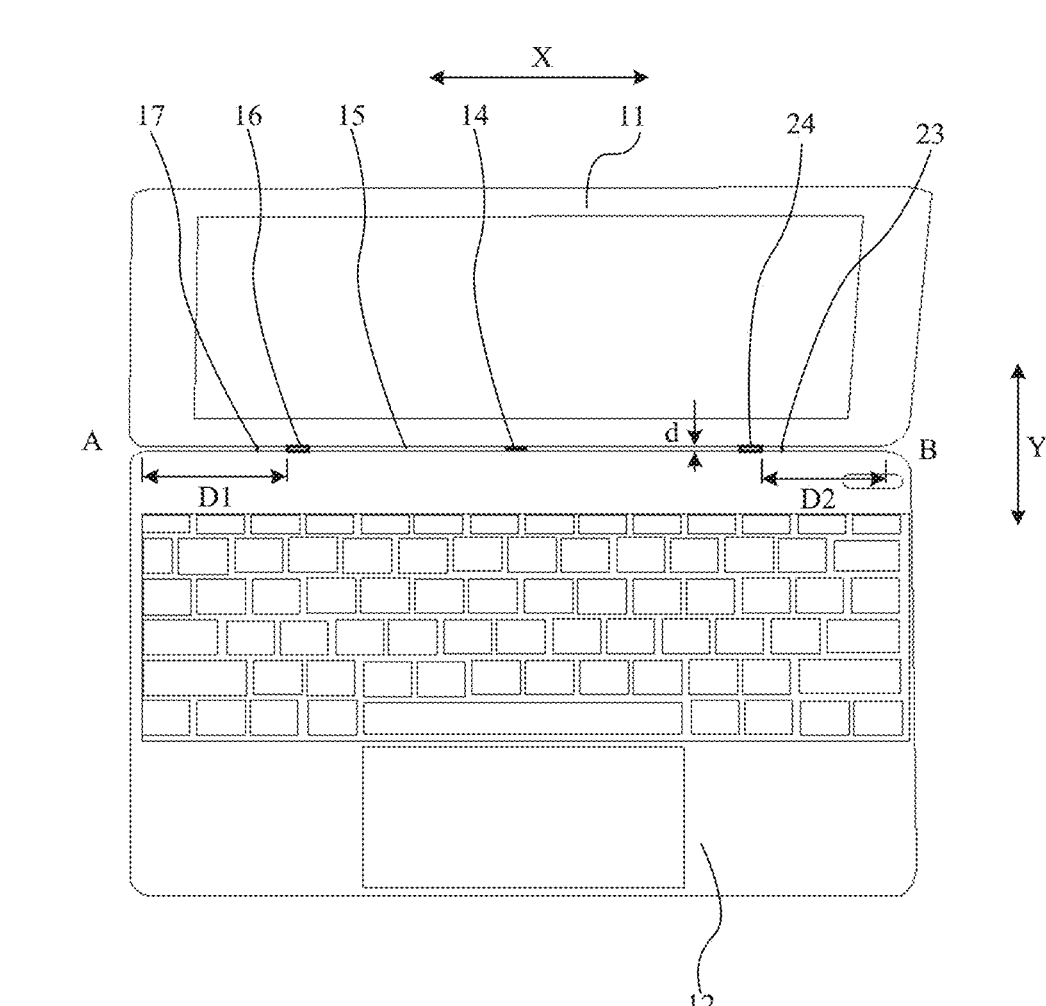
FIG. 33 is a schematic diagram of a structure of an electronic device according to some other embodiments of this application.

In some other embodiments, refer to FIG. 30. FIG. 30 is a schematic diagram of a structure of a surface that is of a keyboard host in an electronic device and that faces a main radiating slot according to some other embodiments of this application. A groove 20 is disposed on the surface that is of the keyboard host 12 and that faces the main radiating slot 15, a side wall and a bottom wall of the groove 20 belong to the housing of the keyboard host 12, and at least one second parasitic radiator 21 is disposed in the groove 20, where "the at least one" means one, two, or more. FIG. 33 shows only an example in which there are two second parasitic radiators 21 disposed in the groove 20. A ground end of the second parasitic radiator 21 is connected to the side wall or the bottom wall of the groove 20, and the at least one second parasitic radiator 21 and the first feed member 17 are located on a same side of the first ground member 16. In this way, the second parasitic radiator 21 is an added parasitic radiator in the first slot antenna other than the main radiating slot. Therefore, a quantity of resonance points of the first slot antenna can be increased, and bandwidth of the first slot antenna can be increased. In addition, the second parasitic radiator 21 is disposed in the groove 20. This can avoid interference between the second parasitic radiator 21 and the display screen 11 caused because the second parasitic radiator 21 protrudes from an outer surface of the keyboard host 12.

The second parasitic radiator 21 may extend along a planar straight line or broken line, or may extend along a three-dimensional broken line. This is not specifically limited herein. In some embodiments, the second parasitic radiator 21 extends along a planar straight line or broken line, the plane on which the second parasitic radiator 21 is located is parallel to the bottom wall of the groove 20, and the ground end of the second parasitic radiator 21 is connected to the side wall of the groove 20. In this way, a setting depth of the groove 20 can be reduced.

In the foregoing embodiment, the second parasitic radiator 21 may be a straight-line radiator, an L-shaped radiator, an F-shaped radiator, or the like. FIG. 30 provides only an example in which the second parasitic radiator 21 is an F-shaped radiator, and cannot be considered as a particular limitation on this application.

Figure 31:
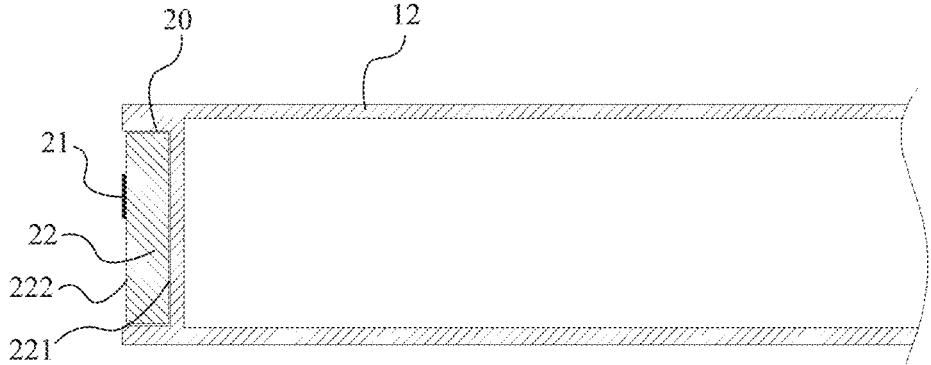
FIG. 31 is a schematic diagram of a cross-section structure of the keyboard host shown in FIG. 30 along an A-A direction.

FIG. 31 is a schematic diagram of a cross-section structure of the keyboard host shown in FIG. 30 along an A-A direction. The electronic device further includes a dielectric plate 22. The dielectric plate 22 includes a first surface 221 and a second surface 222 that are opposite to each other, the dielectric plate 22 is disposed in the groove 20, the first surface 221 of the dielectric plate 22 is attached to the bottom wall of the groove 20, and the second parasitic radiator 21 is disposed on the second surface 222 of the dielectric plate 22. Specifically, the second parasitic radiator 21 may be a metal layer disposed on the second surface 222, or may be a metal sheet disposed on the second surface 222. Such a structure is simple and is easy to fabricate.

FIG. 32 is a diagram of an input return loss and a diagram of system efficiency of the first slot antenna shown in FIG. 30 and FIG. 31. In FIG. 32, a horizontal coordinate is a frequency (unit: GHz), a vertical coordinate is an input return loss coefficient (unit: dB), and S11 represents the input return loss of the first slot antenna. It can be learned from FIG. 32 that the first slot antenna has a plurality of resonance points, and system efficiency at the plurality of resonance points meets a requirement. Therefore, bandwidth is high, and requirements of an MHB antenna, a 5G antenna, and a sub-6G antenna can be met.

FIG. 33 is a schematic diagram of a structure of an electronic device according to some other embodiments of this application. In addition to the first feed member 17 and the first ground member 16, the electronic device further includes a second feed member 23 and a second ground member 24. The second feed member 23 and the second ground member 24 are disposed in the main radiating slot 15, the second feed member 23 and the second ground member 24 are disposed with an interval, the second ground member 24 and the first ground member 16 are located on two opposite sides of the electrical connecting element 14, and the second feed member 23 is located on a side that is of the second ground member 24 and that is far away from the electrical connecting element 14.

In this way, the housing of the display screen 11, the housing of the keyboard host 12, the second ground member 24, and the second feed member 23 form a second slot antenna. The second end B and the second feed member 23 are located on a same side of the second ground member 24, and a length of the second slot antenna is a distance from the second ground member 24 to the second end B (that is, a distance D2 in FIG. 33). The length of the second slot antenna needs to satisfy a condition that the length is far greater than the width of the main radiating slot 15. On a basis of satisfying this condition, the length of the second slot antenna is approximately equal to ¼ times a resonance wavelength of the second slot antenna. The second slot antenna with a corresponding resonant frequency can be obtained by designing a location of the second ground member 24.

A structure form of the second slot antenna may be the same as the structure form of the first slot antenna described in any one of the foregoing embodiments. Details are not described herein again.

The first slot antenna and the second slot antenna may form a MIMO antenna or a dual low frequency antenna. The first slot antenna and the second slot antenna are located at the two ends of the main radiating slot 15. A distance between the first slot antenna and the second slot antenna is long, and isolation is high.

Figure 34:
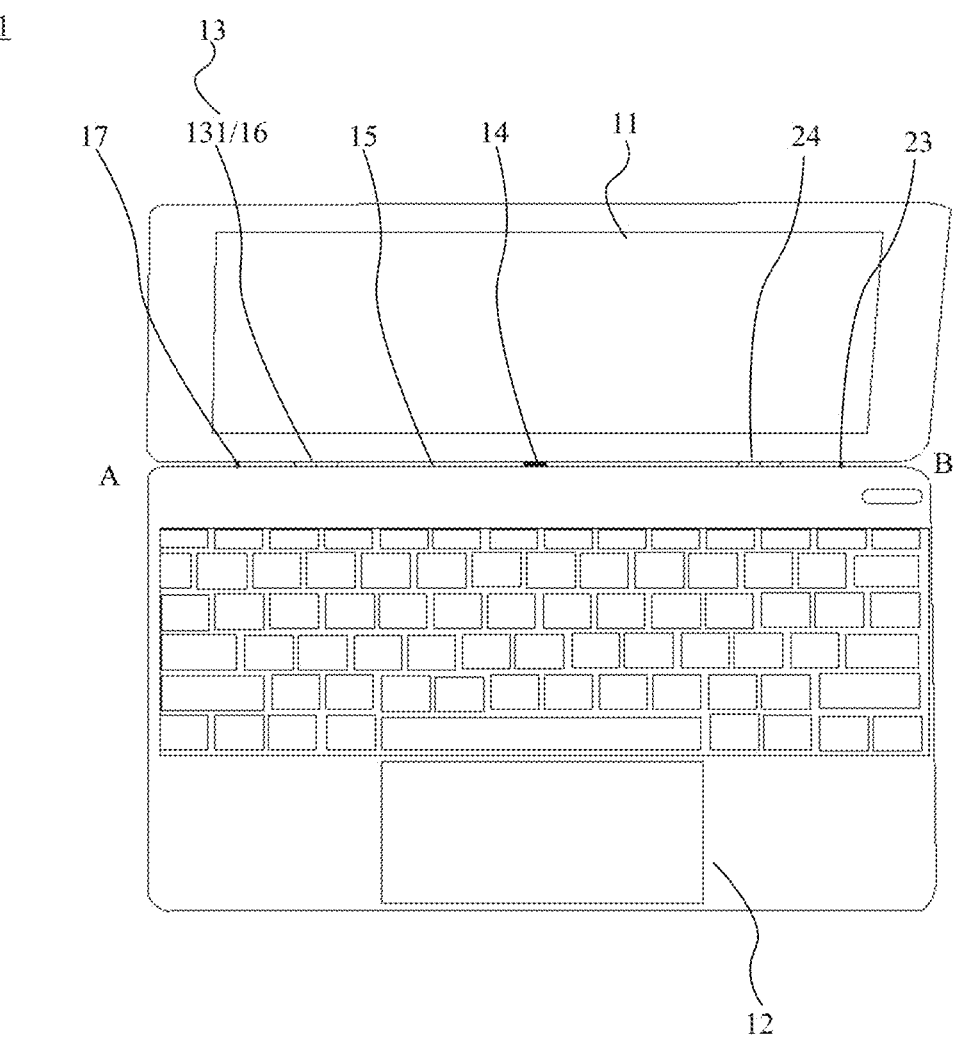
FIG. 34 is a schematic diagram of a structure of an electronic device according to some other embodiments of this application.
Figure 35:
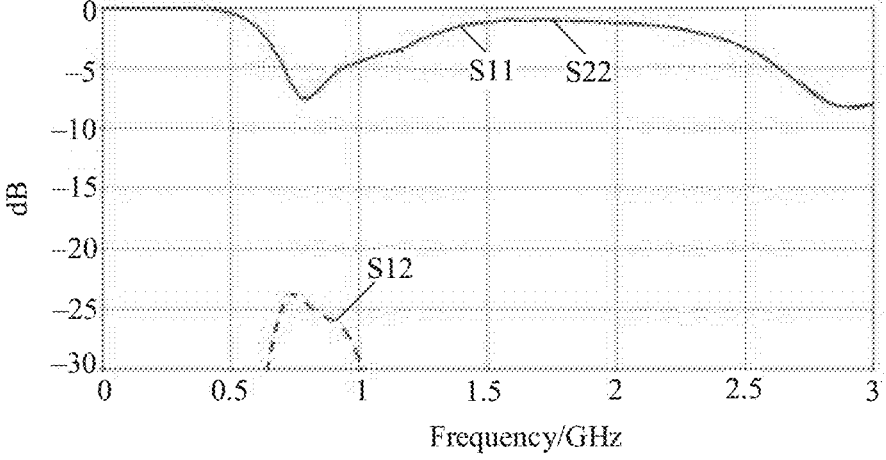
FIG. 35 is a diagram of input return losses of the first slot antenna and the second slot antenna shown in FIG. 34.

FIG. 34 is a schematic diagram of a structure of an electronic device according to some other embodiments of this application. Both the first ground member 16 and the second ground member 24 have a same structure form as the first ground member 16 in the electronic device shown in FIG. 3b, and both the first feed member 17 and the second feed member 23 have a same structure form as the first feed member 17 in the foregoing first implementation. FIG. 35 is a diagram of input return losses of the first slot antenna and the second slot antenna shown in FIG. 34. In FIG. 35, a horizontal coordinate is a frequency (unit: GHz), a vertical coordinate is an input return loss coefficient (unit: dB), S11 represents the input return loss of the first slot antenna, S22 represents the input return loss of the second slot antenna, and S12 represents isolation between the first slot antenna and the second slot antenna. It can be learned from FIG. 35 that the isolation between the first slot antenna and the second slot antenna is under −23 dB, and the isolation is high. This meets a use requirement.

The electronic device provided in embodiments of this application forms, by using the slot between the display screen and the keyboard host, at least one slot antenna with one end open, to obtain the antenna with a ¼ wavelength without occupying internal space of the electronic device. Therefore, the electronic device is not hindered from developing towards optimized functions, thinness, and a fully metalized body.

In the descriptions of this specification, a specific feature, a structure, a material, or a characteristic may be combined in any one or more embodiments or examples in an appropriate manner.

Finally, it should be noted that the foregoing embodiments are merely intended to describe the technical solutions of this application, but not intended to limit this application. Although this application is described in detail with reference to the foregoing embodiments, persons of ordinary skill in the art should understand that they can still make modifications to the technical solutions described in the foregoing embodiments or make equivalent replacements to some technical features thereof, without departing from the spirit and scope of the technical solutions of embodiments of this application.

What is claimed is:

1. An electronic device comprising:
a hinge located on a first side and comprising:
   an insulation part;
   a first conductive part;
   a second conductive part, wherein the first conductive part and the second conductive part are disposed with a first interval and are coupled through the insulation part;
   a rotating shaft comprising:
      a first section disposed along a length direction of the rotating shaft;
      a second section disposed along the length direction;
      a rotating shaft main body made of a metal material and comprising a side wall; and
      an insulation material layer disposed around the side wall, wherein the insulation material layer and the rotating shaft main body jointly constitute the insulation part;
   a first shaft sleeve constituting the first conductive part and sleeved on the first section in a fitted manner; and
   a second shaft sleeve constituting the second conductive part and sleeved on the second section in the fitted manner, wherein the first shaft sleeve and the second shaft sleeve are spaced from each other along an axial direction of the rotating shaft;
a keyboard host comprising:
   a first metal housing coupled to the second conductive part; and
   a keyboard host edge proximate to the hinge;
a display screen rotatably coupled to the keyboard host through the hinge and comprising:
   a second metal housing coupled to the first conductive part; and
   a display screen edge proximate to the hinge;
a main radiating slot formed between the display screen edge and the keyboard host edge;

an electrical connecting element passing through the main radiating slot to electrically couple the display screen to the keyboard host;

a first ground member disposed in the main radiating slot; and a first feed member disposed in the main radiating slot, and disposed in a first second interval with the first ground member, wherein the first ground member is located between the first feed member and the electrical connecting element.

2. The electronic device of claim 1, wherein the hinge comprises a conductive material, and further comprises:

a first end coupled to the display screen and electrically coupled to the second metal housing;

a second end coupled to the keyboard host and electrically coupled to the first metal housing; and the first ground member.

3. The electronic device of claim 1, wherein the first feed member is a conductive member disposed between the display screen and the keyboard host, and wherein the first feed member comprises:

a first end proximate to the display screen and electrically coupled to the second metal housing; and a second end proximate to the keyboard host and insulated from the first metal housing, and wherein the keyboard host further comprises a radio frequency front-end electrically coupled to the second end.

4. The electronic device of claim 1, wherein the hinge comprises an outer side, and wherein the display screen further comprises:

a rotating shaft cover coupled to the second metal housing, located on the outer side, of a conductive material, and comprising a rotating shaft cover edge that is located far away from the display screen, wherein the main radiating slot is further formed between the rotating shaft cover edge and the keyboard host edge, wherein the first feed member is a feed slot disposed on the rotating shaft cover and further comprises:

a first end that is closed;

a second end coupled to the main radiating slot; and a feed point, and wherein the keyboard host further comprises a radio frequency front-end electrically coupled to the feed point.

5. The electronic device of claim 1, wherein the hinge comprises an outer side, and wherein the display screen further comprises a rotating shaft cover coupled to the second metal housing, located on the outer side, and comprising an insulation material, wherein the first feed member is a feed metal wire disposed on the rotating shaft cover and further comprises:

an end coupled to the second metal housing; and a feed point, and wherein the keyboard host further comprises a radio frequency front-end electrically coupled to the feed point.

6. The electronic device of claim 5, wherein the feed metal wire has a straight line shape.

7. The electronic device of claim 5, wherein the feed metal wire has an L shape.

8. The electronic device of claim 1, wherein the hinge constitutes the first feed member, wherein the first shaft sleeve is electrically coupled to the second metal housing, wherein the second shaft sleeve is coupled to the first metal housing in an insulated manner, and wherein the keyboard host comprises a radio frequency front-end coupled to the second shaft sleeve.

9. The electronic device of claim 1, wherein the hinge comprises an outer side, and wherein the display screen further comprises a rotating shaft cover coupled to the second metal housing, located on the outer side, of a conductive material, and comprising a rotating shaft cover edge located far away from the second metal housing, wherein the main radiating slot is further formed between the rotating shaft cover edge and the keyboard host edge, and wherein the electronic device further comprises at least one parasitic radiating slot disposed on the rotating shaft cover, located on the first side, and comprising:

a first end that is closed; and a second end coupled to the main radiating slot.

10. The electronic device of claim 1, wherein the hinge comprises an outer side, and wherein the display screen further comprises:

a rotating shaft cover coupled to the second metal housing, located on the outer side, and comprising an insulation material; and a parasitic radiator disposed on the rotating shaft cover, comprising a ground end coupled to the second metal housing, and located on the first side.

11. The electronic device of claim 1, wherein the keyboard host further comprises a first surface facing the main radiating slot, and wherein the electronic device further comprises:

a groove disposed on the first surface and comprising:

a side wall located on the first metal housing; and a bottom wall located on the first metal housing; and a parasitic radiator disposed in the groove, comprising a ground end coupled to the side wall, and located on the first side.

12. The electronic device of claim 11, wherein the parasitic radiator is configured to extend along a plane, and wherein the plane is parallel to the bottom wall.

13. The electronic device of claim 12, further comprising a dielectric plate disposed in the groove and comprising:

a first surface attached to the bottom wall; and a second surface located opposite to the first surface, wherein the parasitic radiator is disposed on the second surface.

14. The electronic device of claim 1, wherein the electrical connecting element comprises:

a second side; and a third side opposite to the second side, wherein the first ground member is further located on the third side, and wherein the electronic device further comprises:

a second ground member disposed in the main radiating slot, located on the second side, and comprising a fourth side located far away from the electrical connecting element; and a second feed member disposed in the main radiating slot, located on the fourth side, and disposed in a third interval with the second ground member.

15. The electronic device of claim 1, wherein the first feed member is a conductive member disposed between the display screen and the keyboard host, and wherein the first feed member further comprises:

a first end proximate to the display screen and insulated from the second metal housing; and a second end proximate to the keyboard host and electrically coupled to the first metal housing, wherein the keyboard host comprises a radio frequency front-end electrically coupled to the first end.

16. The electronic device of claim 1, wherein the hinge constitutes the first feed member, wherein the first shaft sleeve is coupled to the second metal housing in an insulated manner, wherein the second shaft sleeve is electrically coupled to the first metal housing, and wherein the keyboard host comprises a radio frequency front-end coupled to the first shaft sleeve.

17. The electronic device of claim 1, wherein the keyboard host further comprises a first surface facing the main radiating slot, and wherein the electronic device further comprises:

a groove disposed on the first surface and comprising:

a side wall located on the first metal housing; and a bottom wall located on the first metal housing; and a parasitic radiator disposed in the groove, comprising a ground end coupled to the bottom wall, and located on the first side.

18. The electronic device of claim 1, wherein the insulation material layer comprises a plastic, a rubber, or a silica gel.

19. The electronic device of claim 1, wherein the insulation material layer comprises a rubber.

20. The electronic device of claim 1, wherein the insulation material layer comprises a silica gel.

* * * * *